US012730391B2

(12) United States Patent
Yoshida

(10) Patent No.: US 12,730,391 B2
(45) Date of Patent: Sep. 8, 2026

(54) EXPOSURE APPARATUS AND IMAGE-FORMING APPARATUS

(71) Applicant: CANON KABUSHIKI KAISHA, Tokyo (JP)

(72) Inventor: Michihiro Yoshida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 18/779,414

(22) Filed: Jul. 22, 2024

(65) Prior Publication Data

US 2025/0036039 A1 Jan. 30, 2025

(30) Foreign Application Priority Data

Jul. 28, 2023 (JP) ................................. 2023-123760

(51) Int. Cl.

*G03G 15/04* (2006.01)
*B41J 2/385* (2006.01)
*B41J 2/447* (2006.01)
*G03G 15/00* (2006.01)
*G03G 15/043* (2006.01)

(52) U.S. Cl.

CPC ............ *G03G 15/043* (2013.01); *B41J 2/385* (2013.01); *B41J 2/447* (2013.01); *G03G 15/04036* (2013.01); *G03G 15/5045* (2013.01); *G03G 2215/00084* (2013.01)

(58) Field of Classification Search

CPC ........... G03G 15/043; G03G 15/04036; G03G 15/5045; G03G 2215/00084; B41J 2/385; B41J 2/447

See application file for complete search history.

(56) References Cited

U.S. PATENT DOCUMENTS

| | | | | |
|---|---|---|---|---|
| 6,545,692 B1 * | 4/2003 | Goto | H04N 1/4015 | 347/130 |
| 2002/0024510 A1 * | 2/2002 | Ozawa | G09G 3/3688 | 345/204 |
| 2009/0041503 A1 * | 2/2009 | Yamaguchi | H04N 1/1933 | 399/220 |
| 2023/0185212 A1 * | 6/2023 | Kondo | G03G 15/04054 | 399/218 |

FOREIGN PATENT DOCUMENTS

| | | | | |
|---|---|---|---|---|
| JP | 2020059124 A | * | 4/2020 | B41J 2/447 |
| JP | 2021035765 A | | 3/2021 | |

* cited by examiner

*Primary Examiner* — Yaovi M Ameh
(74) *Attorney, Agent, or Firm* — ROSSI, KIMMS & McDOWELL LLP

(57) ABSTRACT

An exposure apparatus for exposing a photosensitive member includes: a first chip that includes a plurality of first light-emitting portions arranged along an axial direction of the photosensitive member; a second chip, arranged at a different position from the first chip in the axial direction, that includes a plurality of second light-emitting portions arranged along the axial direction; and a control unit configured to output image data that is a set of binary bits each indicating a first or second value. A first part and a second part of the image data are output to the first and second chips, respectively. The control unit is configured to control a driving current supplied in each of the first and second chips based on a counted number of bits indicating the first value in the corresponding part of the image data.

14 Claims, 17 Drawing Sheets

EXPOSURE APPARATUS AND IMAGE-FORMING APPARATUS

BACKGROUND OF THE INVENTION

Field of the Invention

The present invention relates to an exposure apparatus and an image-forming apparatus.

Description of the Related Art

An electrophotographic image-forming apparatus forms an image by exposing a rotationally-driven photosensitive member with light to form an electrostatic latent image on it and developing the electrostatic latent image with toner. Among others, a solid-state exposure type exposure apparatus, that utilizes light from a light-emitting element array, is attracting attention because its downsizing, enhancing quietness, and cost reduction are easier compared to a laser-scanning type exposure apparatus.

Japanese Patent Laid-Open No. 2021-35765 discloses a solid-state exposure type exposure apparatus in which organic electro-luminescence (EL) elements are adopted. In the exposure apparatus disclosed in Japanese Patent Laid-Open No. 2021-35765, the voltages to be applied to a light-emitting element array are adjusted so as to suppress light amount unevenness based on a result of measuring variations in light amount obtained in a factory in advance.

Japanese Patent Laid-Open No. 2020-59124 discloses a solid-state exposure type exposure apparatus in which light-emitting thyristors are adopted as the light-emitting elements. In the exposure apparatus disclosed in Japanese Patent Laid-Open No. 2020-59124, the driving current of each light-emitting element is adjusted based on a result of estimating a heat generation amount of a chip, in order to compensate for reduction in light amount of a light-emitting thyristor whose output light amount decreases as the temperature increases.

SUMMARY OF THE INVENTION

The light amount output from an organic EL element is, in general, small relative to a semiconductor laser or an inorganic EL element, and therefore it requires light emission in a longer period of time when exposing a photosensitive member with light. When an unevenness is present in light amount, the deviation from a target light amount is integrated over the exposure time, and as a result, density unevenness in a print image becomes prominent as a degradation in image quality. In Japanese Patent Laid-Open No. 2020-59124, a technique is disclosed in which reduction in light amount of the light-emitting thyristor is compensated for by increasing the driving current when a heat generation amount of the light-emitting chip is large, however, the temperature-light amount characteristic of the organic EL element differs from the temperature-light amount characteristic of the light-emitting thyristor.

The present invention aims at providing a mechanism that can avoid image quality degradation by suppressing the light amount unevenness in a solid-state exposure type exposure apparatus that adopts organic EL elements.

According to an aspect, there is provided an exposure apparatus for exposing a photosensitive member with light, the exposure apparatus including: a first light-emitting chip that includes a plurality of first light-emitting portions arranged along an axial direction of the photosensitive member and is configured to supply a first driving current to the plurality of first light-emitting portions; a second light-emitting chip, arranged at a different position from the first light-emitting chip in the axial direction, that includes a plurality of second light-emitting portions arranged along the axial direction and is configured to supply a second driving current to the plurality of second light-emitting portions; and a control unit configured to output image data that is a set of binary bits each indicating a first value or a second value. A first part of the image data is output to the first light-emitting chip and a second part of the image data is output to the second light-emitting chip. The control unit is configured to: control the first driving current based on the number of bits indicating the first value in the first part of the image data; and control the second driving current based on the number of bits indicating the first value in the second part of the image data. There is also provided an image-forming apparatus including: the photosensitive member; and the exposure apparatus.

Further features of the present invention will become apparent from the following description of exemplary embodiments (with reference to the attached drawings).

DESCRIPTION OF THE EMBODIMENTS

Figure 1:
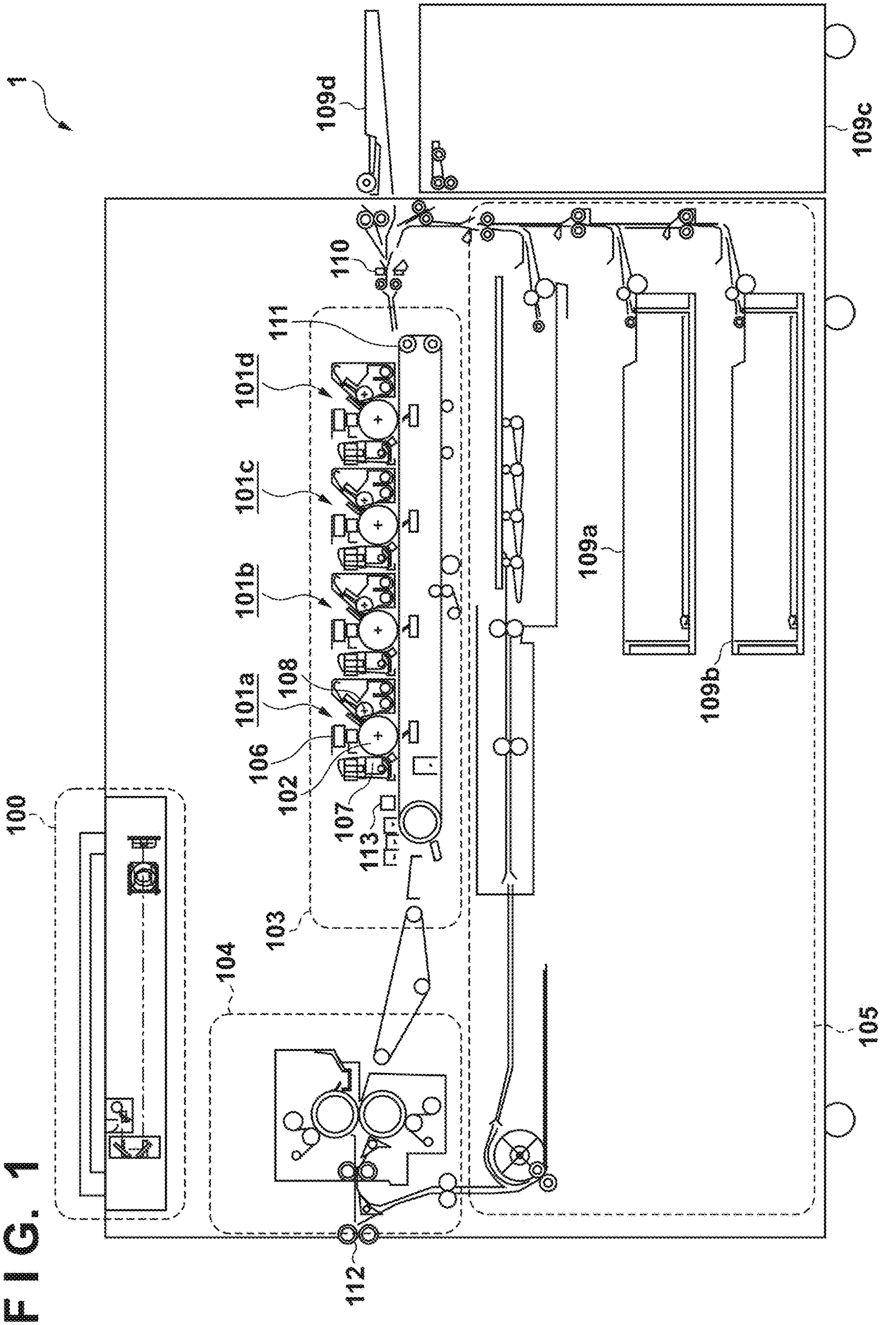
FIG. 1 is a configuration diagram illustrating a schematic configuration of an image-forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<1. Schematic Configuration of Image-Forming Apparatus>

FIG. 1 shows an example of a schematic configuration of an image-forming apparatus 1 according to an embodiment. The image-forming apparatus 1 includes a reading unit 100, an image-making unit 103, a fixing unit 104, and a transport unit 105. The reading unit 100 optically reads an original placed on a platen and generates read image data. The image-making unit 103 forms an image on a sheet based on the read image data generated by the reading unit 100 or based on print image data received from an external device via a network, for example.

The image-making unit 103 includes image-forming units 101*a*, 101*b*, 101*c*, and 101*d*. The image-forming units 101*a*, 101*b*, 101*c*, and 101*d* form toner images in black, yellow, magenta, and cyan, respectively. The image-forming units 101*a*, 101*b*, 101*c* and 101*d* have the same configuration, and are also referred to collectively as image-forming units 101 below. A photosensitive member 102 of the image-forming unit 101 is driven to rotate in the clockwise direction in the figure during image formation. A charger 107 electrically charges the photosensitive member 102. An exposure head 106 exposes the photosensitive member 102 with light to form an electrostatic latent image on a surface of the photosensitive member 102. A developer 108 develops the electrostatic latent image on the photosensitive member 102 with toner to form a toner image. The toner image formed on the surface of the photosensitive member 102 is transferred to a sheet that is being transported on a transfer belt 111. A color image containing four color components, namely black, yellow, magenta, and cyan can be formed by transferring the toner images of the four photosensitive members 102 to the sheet in a superimposed manner.

The transport unit 105 controls feed and transport of sheets. Specifically, the transport unit 105 feeds a sheet from a unit designated from among internal storage units 109*a* and 109*b*, an external storage unit 109*c*, and a manual feed unit 109*d* to a transport path in the image-forming apparatus 1. The fed sheet is transported to a registration roller 110. The registration roller 110 transports the sheet onto the transfer belt 111 at an appropriate timing such that the toner image of each photosensitive member 102 is transferred to the sheet. As mentioned above, the toner images are transferred to the sheet while the sheet is transported on the transfer belt 111. The fixing unit 104 fixes the toner images to the sheet by heating and pressurizing the sheet to which the toner images have been transferred. After the toner images have been fixed, the sheet is discharged to outside the image-forming apparatus 1 by a discharge roller 112. An optical sensor 113 is located at a position facing the transfer belt 111. The optical sensor 113 optically reads a test chart formed on the transfer belt 111 by the image-forming units 101. In a case where an error in an image-forming range is detected for the test chart read by the optical sensor 113, an image controller 700 described below performs control for compensating for the error when executing subsequent jobs.

Although an example in which the toner image is directly transferred from each photosensitive member 102 to the sheet on the transfer belt 111 has been described here, the toner image may alternatively be transferred indirectly from each photosensitive member 102 to the sheet via an intermediate transfer member. Further, although an example of forming a color image using toner of multiple colors has been described here, the technology according to the present disclosure is also applicable to an image-forming apparatus that forms a monochrome image using toner of a single color.

<2. Configuration Example of Exposure Head>

Figure 2A:
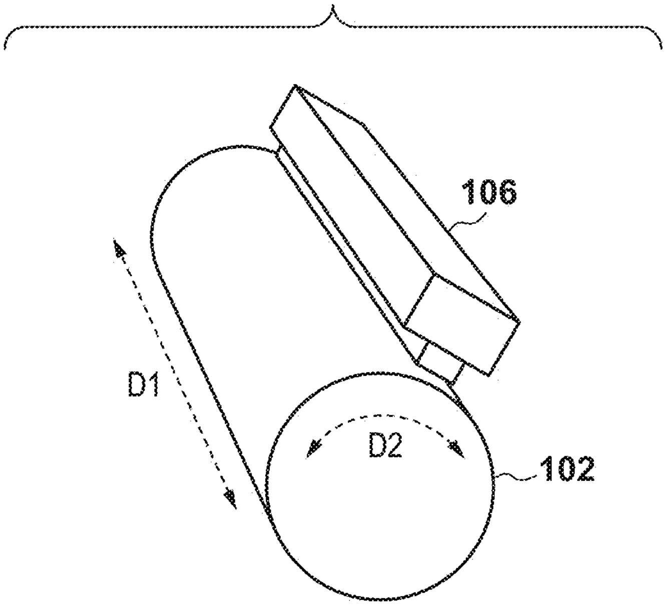
FIG. 2A is a first illustrative diagram illustrating a configuration of a photosensitive member and an exposure head according to an embodiment.
Figure 2B:
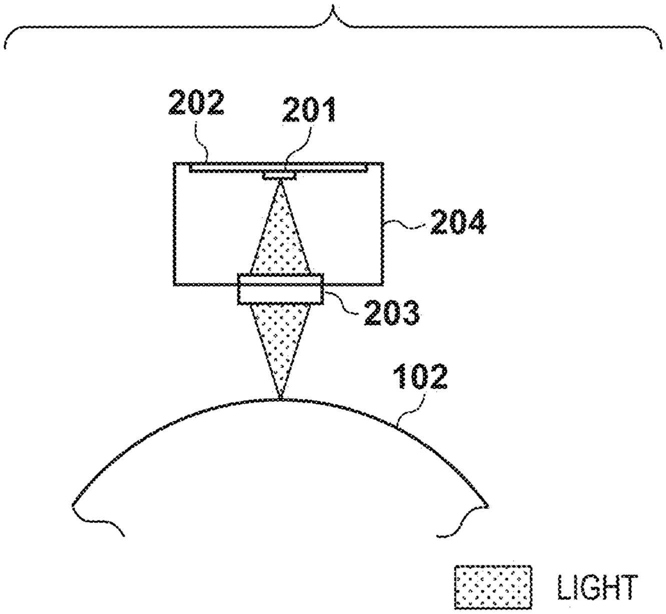
FIG. 2B is a second illustrative diagram illustrating a configuration of the photosensitive member and the exposure head according to an embodiment.

FIGS. 2A and 2B show the photosensitive member 102 and the exposure head 106. The exposure head 106 includes a light-emitting element array 201, a printed circuit board 202 on which the light-emitting element array 201 is mounted, a rod lens array 203, and a housing 204 supporting the printed circuit board 202 and the rod lens array 203. The photosensitive member 102 has a cylindrical shape. The exposure head 106 is arranged such that the longitudinal direction thereof is parallel to an axial direction D1 of the photosensitive member 102, and a face of the exposure head 106 to which the rod lens array 203 is attached faces the surface of the photosensitive member 102. While the photosensitive member 102 rotates in a circumferential direction D2, the light-emitting element array 201 of the exposure head 106 emits light, and the rod lens array 203 images the light onto the surface of the photosensitive member 102.

Figure 3A:
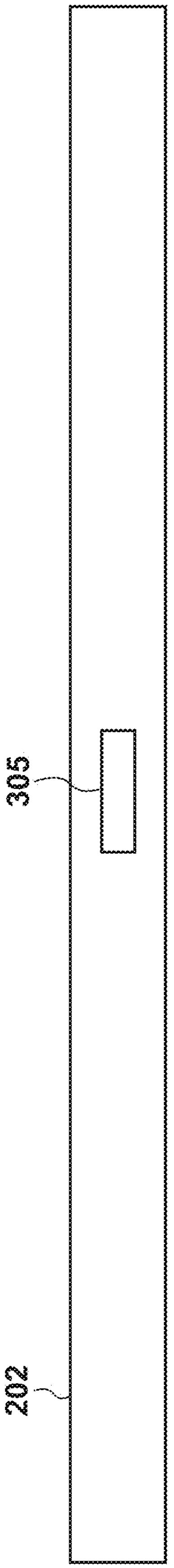
FIG. 3A is a first illustrative diagram illustrating a configuration of a printed circuit board of the exposure head according to an embodiment.
Figure 3B:
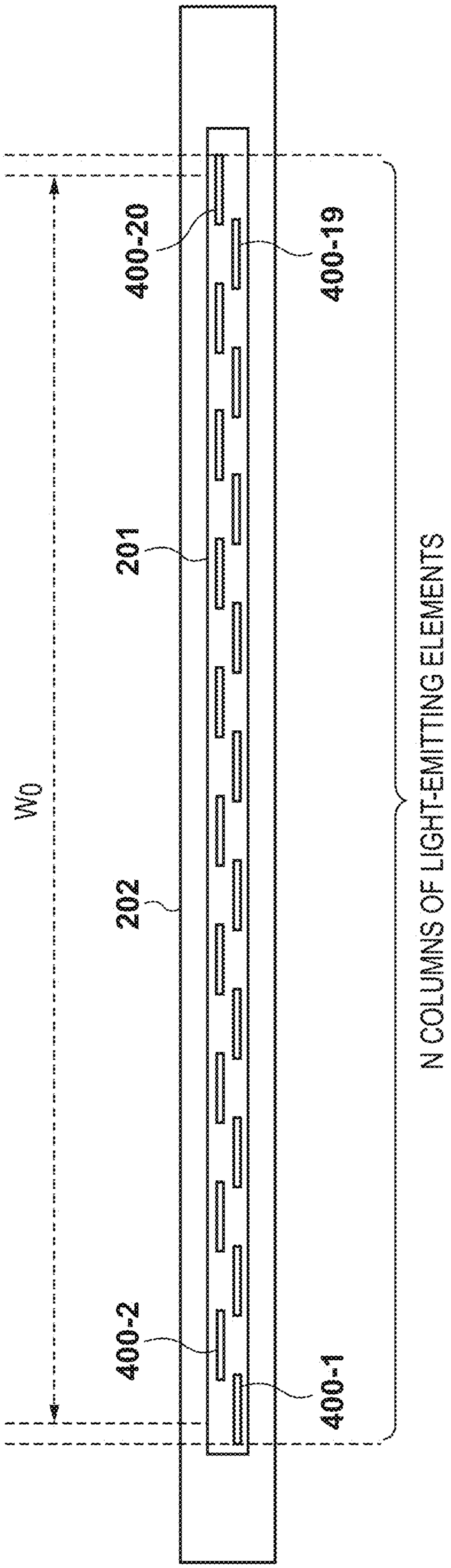
FIG. 3B is a second illustrative diagram illustrating a configuration of the printed circuit board of the exposure head according to an embodiment.
Figure 4:
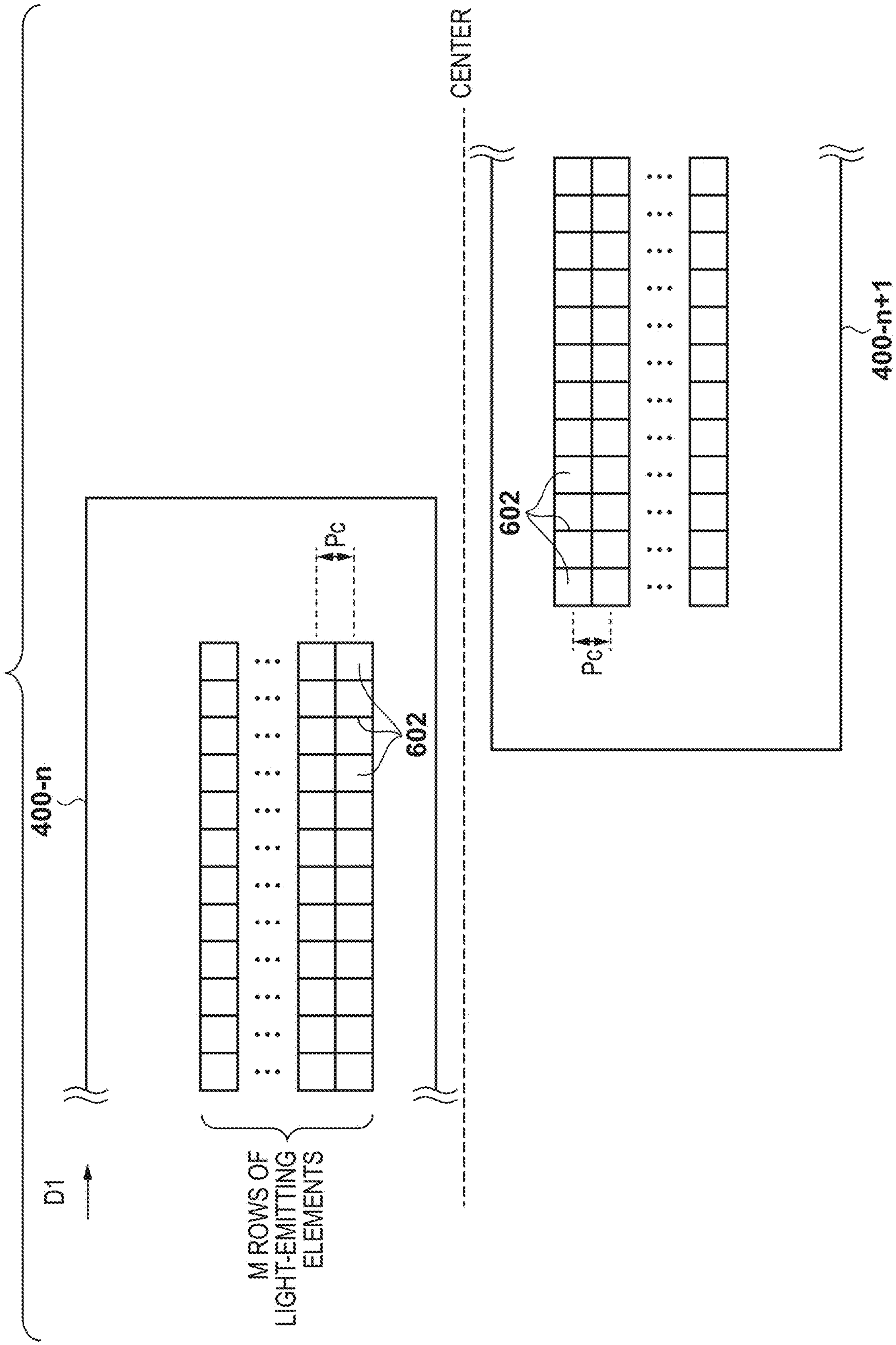
FIG. 4 is an illustrative diagram regarding light-emitting chips and light-emitting element arrays in the light-emitting chips according to an embodiment.

FIGS. 3A and 3B show an example of a configuration of the printed circuit board 202. Note that FIG. 3A shows a side on which a connector 305 is mounted, and FIG. 3B shows a side on which the light-emitting element array 201 is mounted (a face on the side opposite to the face on which the connector 305 is mounted). FIG. 4 schematically shows light-emitting chips 400 and arrays of light-emitting elements 602 in the light-emitting chips 400.

In the present embodiment, the light-emitting element array 201 has a plurality of light-emitting elements that are arranged two-dimensionally. The light-emitting element array 201 as a whole includes N columns of light-emitting elements in the axial direction D1 of the photosensitive member and M rows in the circumferential direction D2 of the photosensitive member, where M and N are integers no less than two. In the example of FIG. 3B, the light-emitting element array 201 is constituted by separate twenty light-emitting chips 400-1 to 400-20, each of which includes a subset of the entire plurality of light-emitting elements, and the light-emitting chips 400-1 to 400-20 are arranged in a staggered manner along the axial direction D1. The light-emitting chips 400-1 to 400-20 are also referred to collectively as light-emitting chips 400. As illustrated in FIG. 3B, the range occupied by the entire light-emitting elements of the twenty light-emitting chips in the axial direction D1 is wider than the range occupied by the maximum width Wo of input image data. Accordingly, some light-emitting elements located at both ends in the axial direction D1 may not be used for exposing the photosensitive member 102 unless an error in the image-forming range is detected. Each light-emitting chip 400 on the printed circuit board 202 is connected to the image controller 700 (FIG. 7) via the connector 305. In the following, there are cases where the smaller branch number side of the light-emitting chips 400-1 to 400-20 arranged in the axial direction D1 is referred to as "left" and the larger branch number side as "right", for convenience of description. For example, the light-emitting chip 400-1 is a light-emitting chip 400 at the left end, and the light-emitting chip 400-20 is a light-emitting chip at the right end.

The number J of light-emitting elements 602 arranged in each row of one light-emitting chip 400 (J=N/20) may be equal to 748 (J=748), for example. Meanwhile, the number M of light-emitting elements 602 arranged in each column of one light-emitting chip 400 may be equal to 4 (M=4), for example. That is to say, in an example embodiment, each light-emitting chip 400 has 2992 (=748*4) light-emitting elements 602 in total, with 748 elements in the axial direction D1 and 4 elements in the circumferential direction D2. The interval between central points of light-emitting elements 602 adjoining in the circumferential direction D2 may be approximately 21.16 μm corresponding to a resolution of 1200 dpi, for example. The interval between central points of light-emitting elements 602 adjoining in the axial direction D1 may also be approximately 21.16 μm and, in this case, 748 light-emitting elements 602 occupy the length of approximately 15.8 mm in the axial direction D1. It should be noted that, for convenience of description, FIG. 4 shows an example where the light-emitting elements 602 are arranged completely in a grid-like pattern in each light-emitting chip 400, however, the M (M=4) light-emitting elements 602 of each column may be arranged in a staircase pattern or in a partially-staircase pattern. The arrangement of light-emitting elements 602 in a staircase pattern will be further described below.

Figure 5:
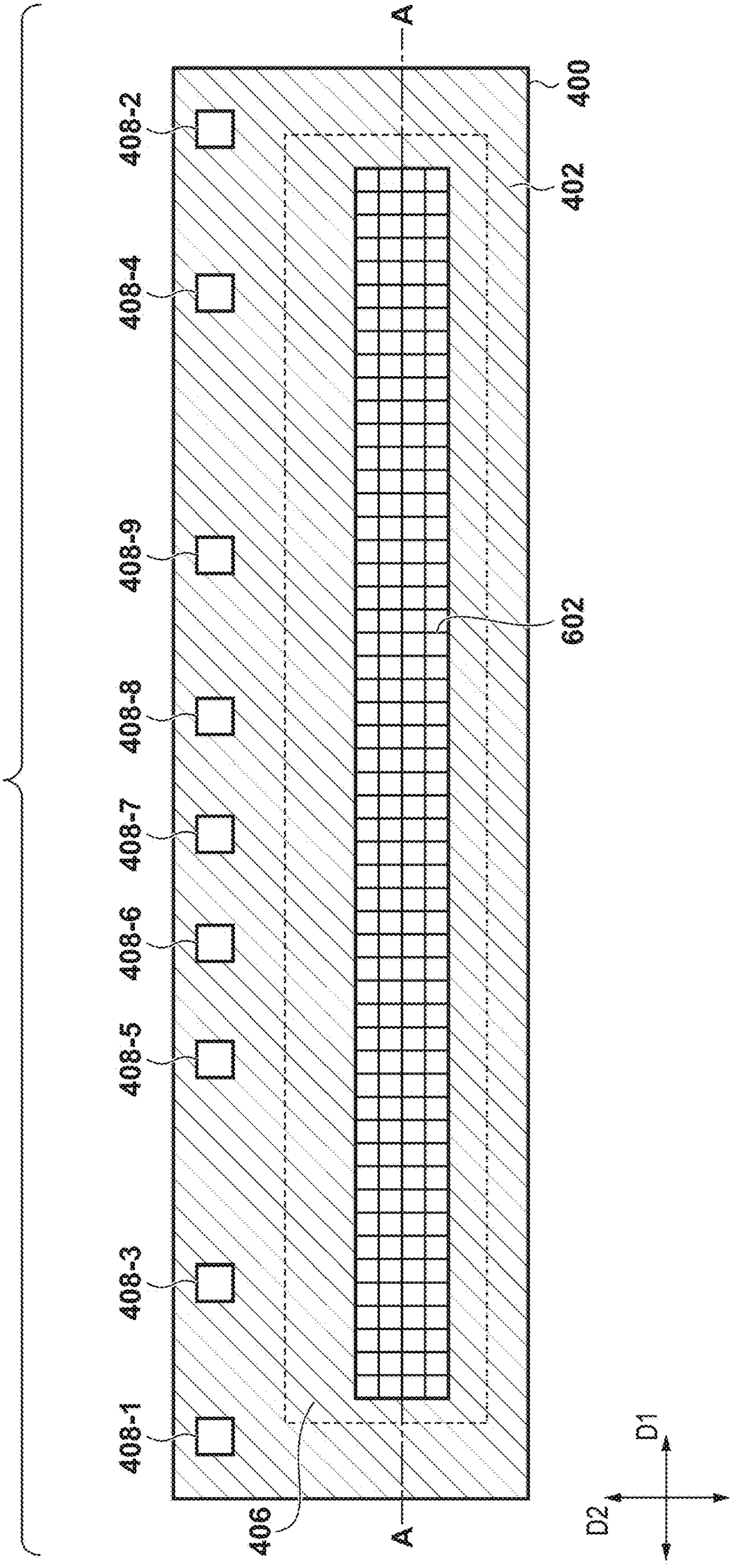
FIG. 5 is a plan view of a schematic configuration of the light-emitting chip according to an embodiment.

FIG. 5 is a plan view of a schematic configuration of the light-emitting chip 400. The plurality of light-emitting elements 602 of each light-emitting chip 400 are formed on a light-emitting substrate 402, which is a silicon substrate, for example. The light-emitting substrate 402 has a circuit section 406 for supplying driving currents to the plurality of light-emitting elements 602 to drive the plurality of light-emitting elements 602. Pads 408-1 to 408-9 are connected to signal lines for communicating with the image controller 700, power lines for connection with power supplies, and ground lines for connection with ground. The signal lines, the power lines, and the ground lines may be gold wires, for example.

Figure 6:
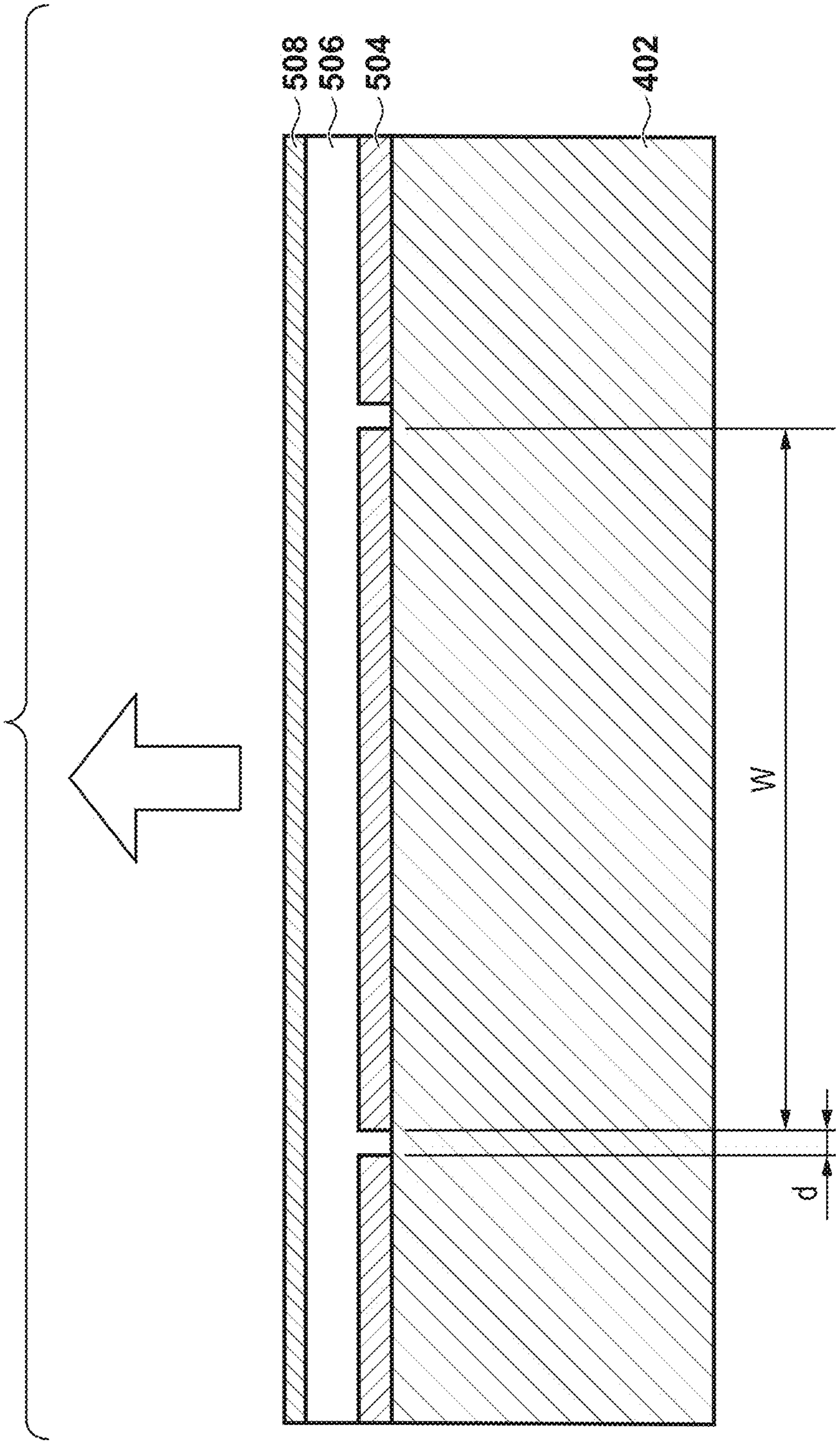
FIG. 6 is a cross-sectional view of a schematic configuration of the light-emitting chip according to an embodiment.

FIG. 6 shows a portion of a cross-section of FIG. 5 taken along a line A-A. A plurality of lower electrodes 504 are formed on the light-emitting substrate 402. A gap with length d is provided between two adjoining lower electrodes 504. A light-emitting layer 506 is provided on the lower electrodes 504, and an upper electrode 508 is provided on the light-emitting layer 506. The upper electrode 508 is one common electrode for the plurality of lower electrodes 504. When a voltage is applied between the lower electrodes 504 and the upper electrode 508, the light-emitting layer 506 emits light as a result of electric current flowing from the lower electrodes 504 to the upper electrode 508. Thus, one lower electrode 504 and partial regions of the light-emitting layer 506 and the upper electrode 508 that correspond to the lower electrode 504 constitute one light-emitting element 602. That is, in the present embodiment, the light-emitting substrate 402 includes a plurality of light-emitting elements 602.

An organic EL film can be used as the light-emitting layer 506, for example. The upper electrode 508 is constituted by a transparent electrode made of indium tin oxide (ITO) or the like, for example, so as to allow the light-emission wavelength of the light-emitting layer 506 to pass through. Note that, in the present embodiment, the entire upper electrode 508 allows the light-emission wavelength of the light-emitting layer 506 to pass through, but the entire upper electrode 508 does not necessarily allow the light-emission wavelength to pass through. Specifically, it is sufficient that a partial region through which light from each light-emitting element 602 passes allows the light-emission wavelength to pass through.

Note that, in FIG. 6, one continuous light-emitting layer 506 is formed, but a plurality of light-emitting layers 506 each having a width equal to the width W of a corresponding lower electrode 504 may alternatively be formed on the respective lower electrodes 504. Further, in FIG. 6, the upper electrode 508 is formed as one common electrode for the plurality of lower electrodes 504; but, a plurality of upper electrodes 508 each having a width equal to the width W of a corresponding lower electrode 504 may alternatively be formed in correspondence with the respective lower electrodes 504. Further, a first plurality of lower electrodes 504, out of the lower electrodes 504 of each light-emitting chip 400, may be covered by a first light-emitting layer 506, and a second plurality of lower electrodes 504 may be covered by a second light-emitting layer 506. Similarly, a first upper electrode 508 may be formed in common for a first plurality of lower electrodes 504, out of the lower electrodes 504 of each light-emitting chip 400, and a second upper electrode 508 may be formed in common for a second plurality of lower electrodes 504. With such a configuration as well, one lower electrode 504 and regions of the light-emitting layer 506 and the upper electrode 508 that correspond to the lower electrode 504 constitute one light-emitting element 602.

Figure 7:
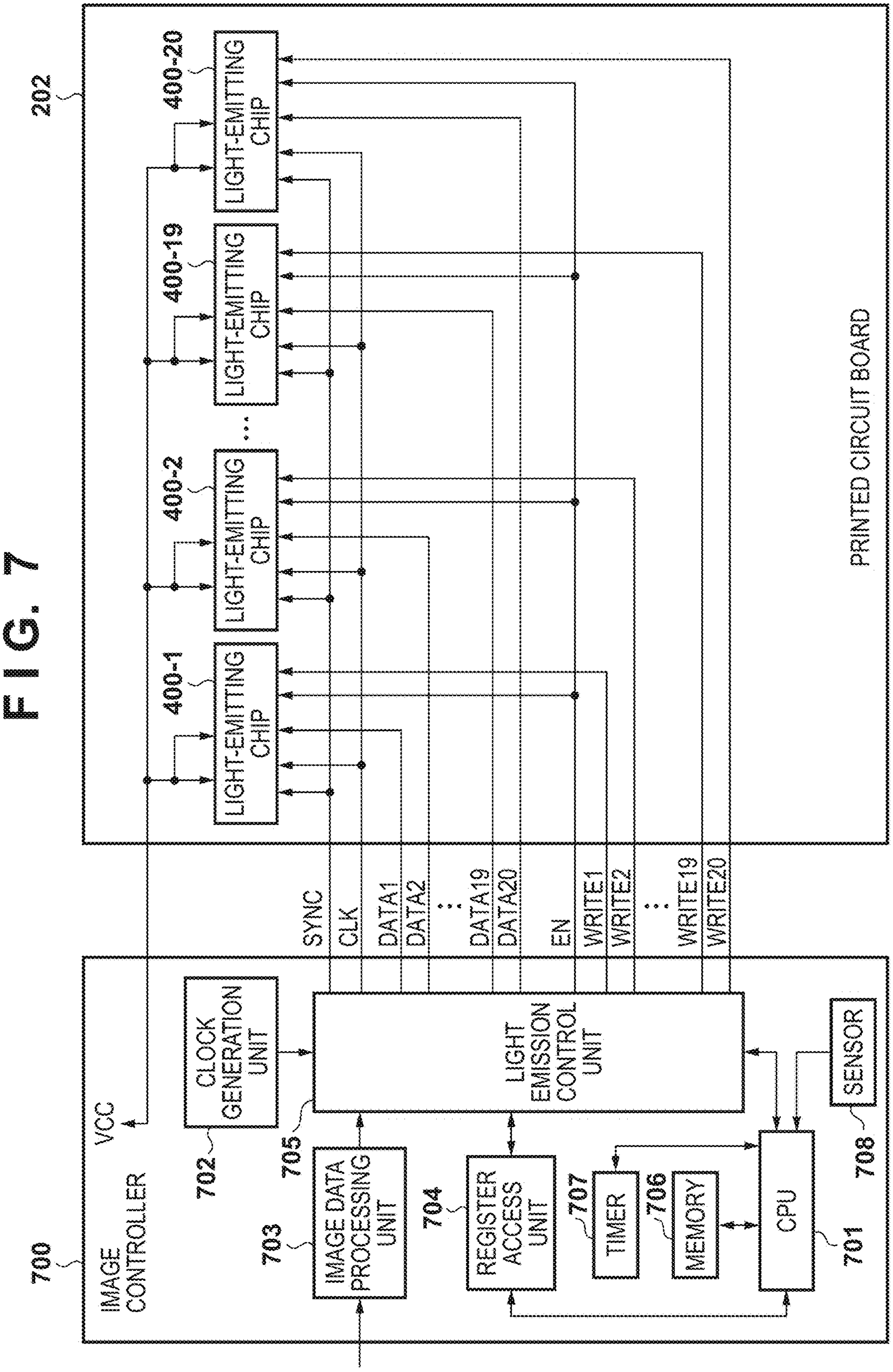
FIG. 7 is a circuit diagram illustrating a control configuration of an exposure apparatus according to an embodiment.

FIG. 7 is a circuit diagram related to a control configuration for controlling the light-emitting chips 400. The image controller 700 is a control circuit that communicates with the printed circuit board 202 via a plurality of signal lines (wires). The image controller 700 includes a CPU 701, a clock generation unit 702, an image data processing unit 703, a register access unit 704, a light emission control unit 705, a memory 706, a timer 707, and a temperature sensor 708. The light emission control unit 705 terminates the signal lines connected to the printed circuit board 202. An n-th light-emitting chip 400-*n* (n is an integer from 1 to 20) on the printed circuit board 202 is connected to the light emission control unit 705 via a signal line DATAn and a signal line WRITEn. The signal line DATAn is used to transmit image data from the image controller 700 to the light-emitting chip 400-*n*. The signal line WRITEn is used by the image controller 700 to write control data to a register of the light-emitting chip 400-*n*.

One signal line CLK, one signal line SYNC, and one signal line EN are also provided between the light emission control unit 705 and respective light-emitting chips 400. The signal line CLK is used to transmit a clock signal for data transmission over the signal lines DATAn and WRITEn. The light emission control unit 705 outputs, to the signal line CLK, a clock signal generated based on a reference clock signal from the clock generation unit 702. Signals transmitted to the signal line SYNC and the signal line EN will be described below.

The CPU 701 controls the entire image-forming apparatus 1. The image data processing unit 703 performs image processing on image data received from the reading unit 100 or an external device, and generates image data in a binary bitmap format, that is, a set of binary bits for performing control to turn on and off light emission of the light-emitting elements 602 of the light-emitting chips 400 on the printed circuit board 202. Image processing here may include, for example, raster conversion, gradation correction, color conversion, and halftoning. The image data processing unit 703 transmits the generated image data as input image data to the light emission control unit 705. In an example, a first value of the binary bit (e.g. '1') indicates that the corresponding light-emitting element 602 should be turned on, and a second value of the binary bit (e.g. '0') indicates that the corresponding light-emitting element 602 should be turned off, or vice versa. However, the format of the image data is not limited to this example. In another example, the image data may be multivalued data instead of binary bit data. The register access unit 704 receives control data to be written in a register within each light-emitting chip 400 from the CPU 701 to transmit it to the light emission control unit 705. The light emission control unit 705 controls light emission of the light-emitting elements 602 in respective light-emitting chips 400 based on the input image data input from the image data processing unit 703. The memory 706 is a non-volatile storing unit that stores computer programs and data required for the light emission. The timer 707 is a timing unit that measures passage of time. The temperature sensor 708 is a temperature measuring unit that measures an environmental temperature.

Figure 8:
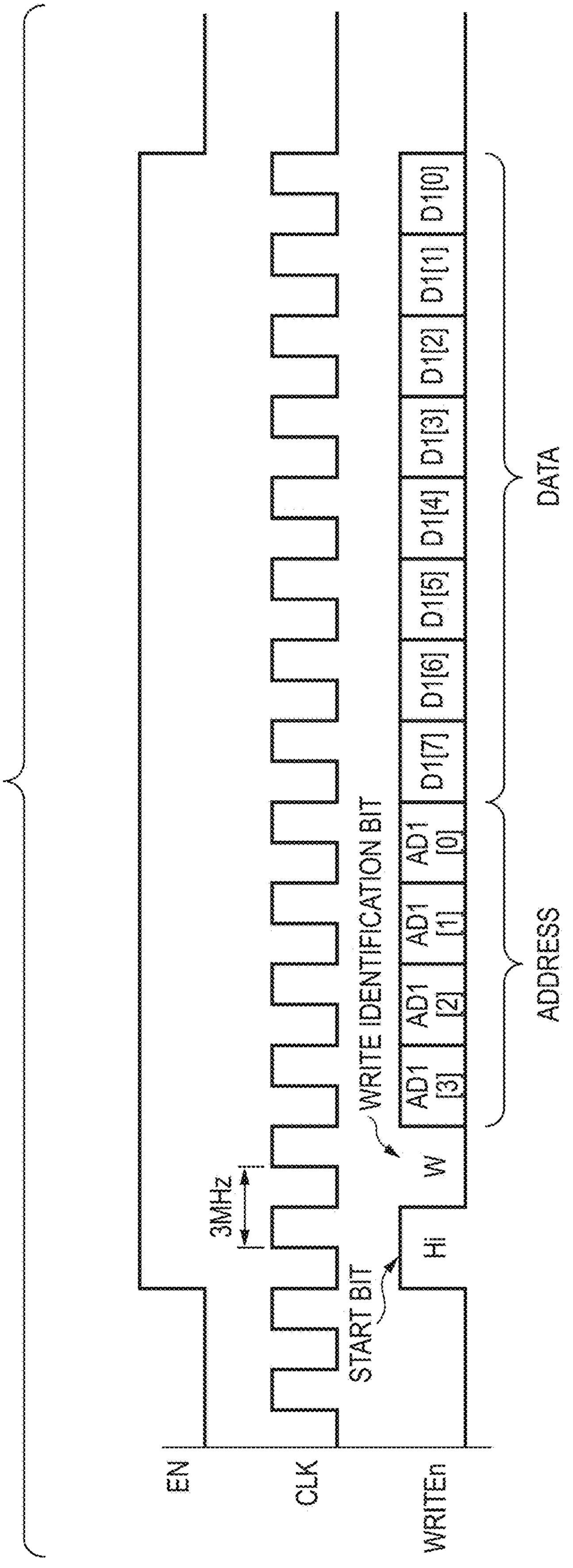
FIG. 8 is a signal chart related to access to a register of the light-emitting chip according to an embodiment.

FIG. 8 shows transition of the signal level on each signal line when writing control data to the register of the light-emitting chip 400. An enable signal, which is at high level during communication, indicating that communication is in progress, is output to the signal line EN. The light emission control unit 705 transmits a start bit to the signal line WRITEn synchronously with the rise of the enable signal. Next, the light emission control unit 705 transmits a write identification bit indicating a write operation, and thereafter transmits an address (four bits in this example) of the register to which control data is to be written, and the control data (eight bits in this example). The light emission control unit 705 sets the frequency of the clock signal transmitted to the signal line CLK to, for example, 3 MHz when writing to the register.

Figure 9:
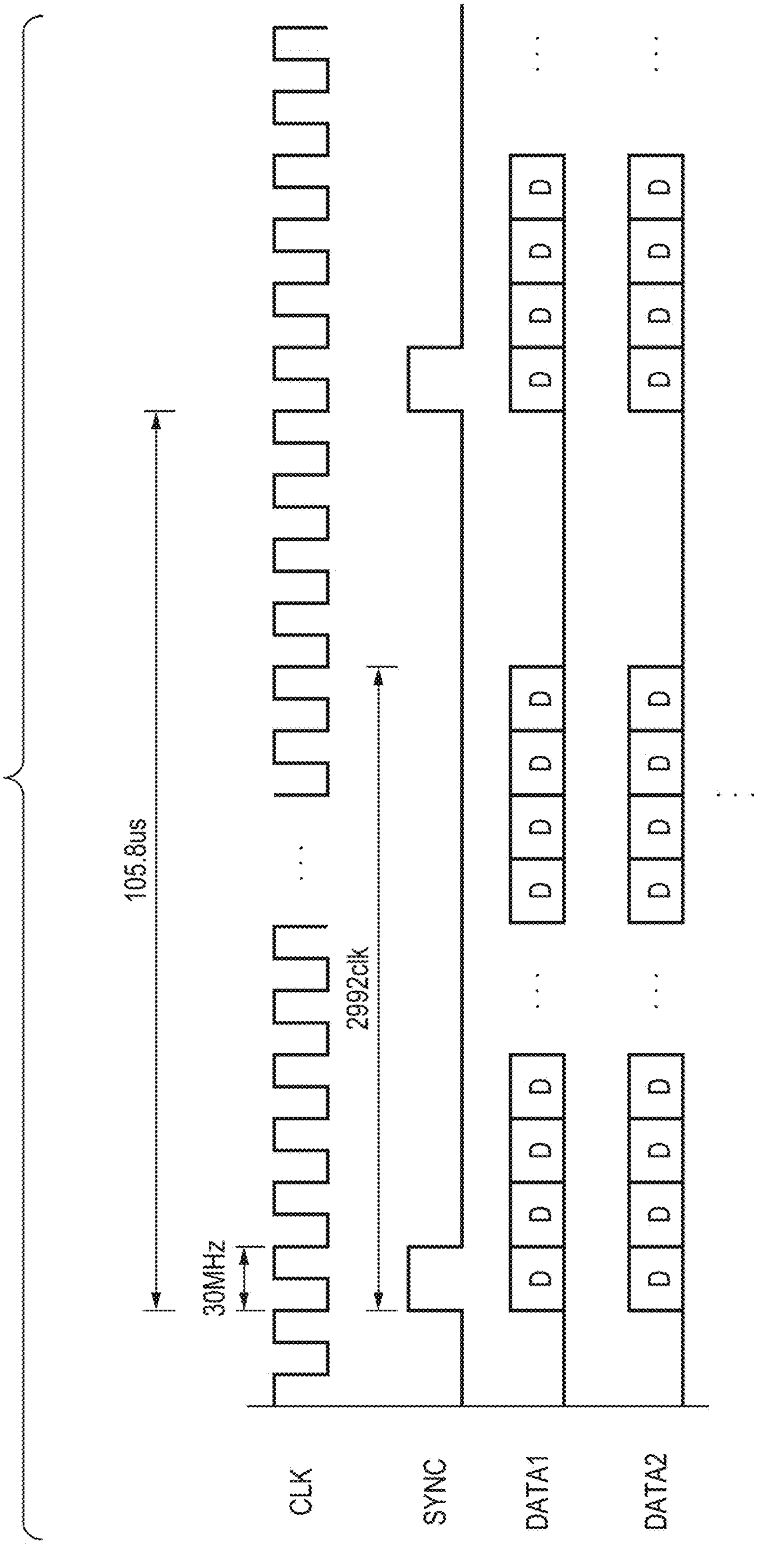
FIG. 9 is a signal chart related to transmission of image data to the light-emitting chip according to an embodiment.

FIG. 9 shows transition of the signal level on each signal line when image data is transmitted to each light-emitting chip 400. A periodic line synchronization signal, which indicates an exposure timing for each line in the photosensitive member 102, is output to the signal line SYNC. When the circumferential velocity of the photosensitive member 102 is 200 mm/s and the resolution in the circumferential direction is 1200 dpi (about 21.16 μm), the line synchronization signal is output at intervals of about 105.8 μs. The light emission control unit 705 transmits image data to the signal lines DATA1 to DATA20 synchronously with the rise of the line synchronization signal. Since each light-emitting chip 400 in the present embodiment has 2992 light-emitting elements 602, image data indicating whether or not to cause each of the 2992 light-emitting elements 602 to emit light needs to be transmitted to each light-emitting chip 400 within a period of about 105.8 μs. Therefore, in this example, the light emission control unit 705 sets the frequency of the clock signal transmitted to the signal line CLK to 30 MHz when transmitting the image data, as shown in FIG. 9.

Figure 10:
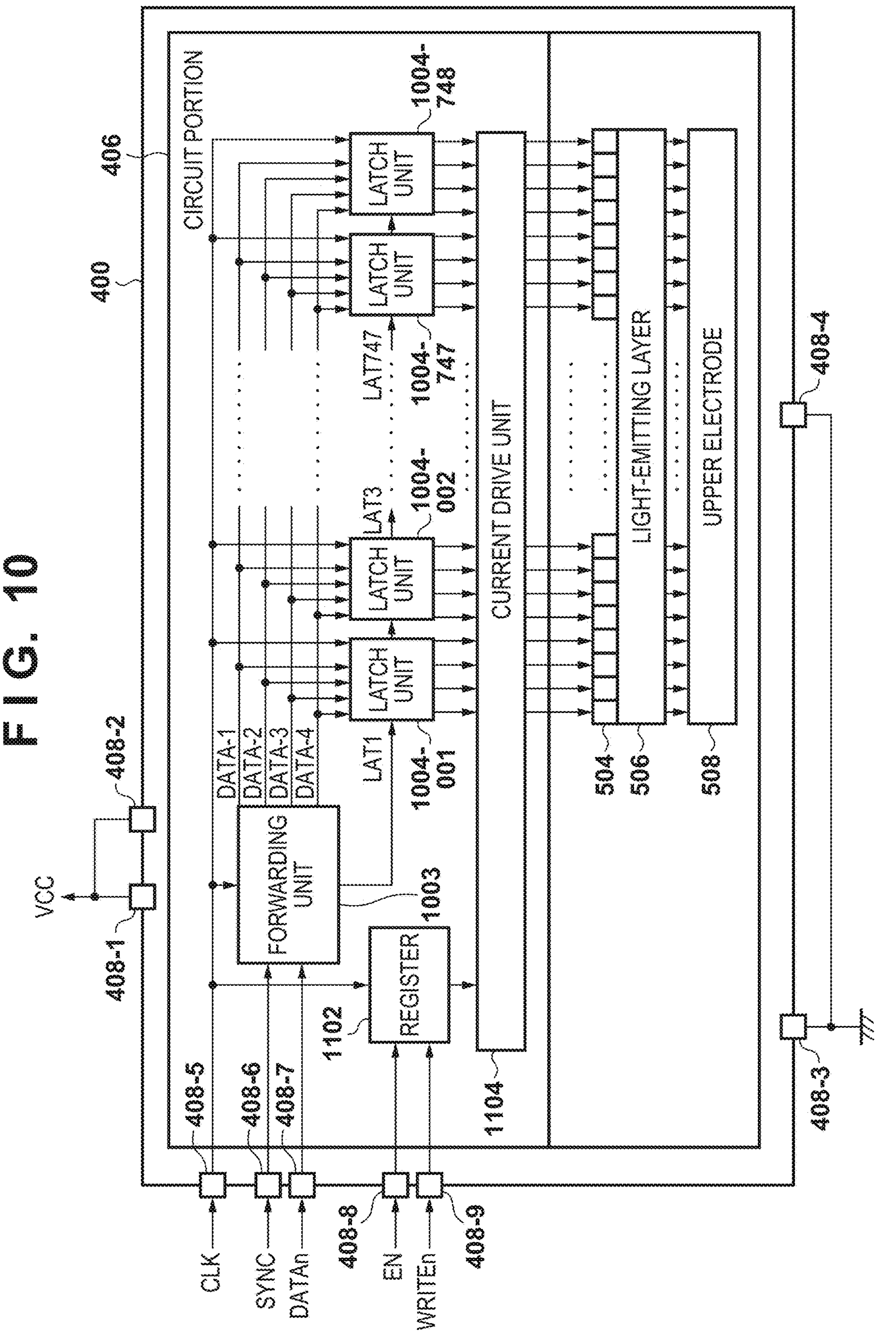
FIG. 10 is a functional block diagram illustrating a detailed configuration of the light-emitting chip according to an embodiment.

FIG. 10 is a functional block diagram illustrating a detailed configuration of one light-emitting chip 400 (n-th light-emitting chip 400-*n*). Each light-emitting chip 400 has nine pads 408-1 to 408-9, as also shown in FIG. 5. The pads 408-1 and 408-2 are connected to a power supply voltage VCC through a power line. Power from this power supply voltage VCC is supplied to each circuit of the circuit portion 406 of the light-emitting chip 400. The pads 408-3 and 408-4 are connected to a ground through a ground line. Each circuit of the circuit portion 406 and the upper electrode 508 are connected to a ground via the pads 408-3 and 408-4. The signal line CLK is connected to a forwarding unit 1003, a register 1102, and latch units 1004-001 to 1004-748 via the pad 408-5. The signal lines SYNC and DATAn are connected to the forwarding unit 1003 via the pads 408-6 and 408-7. The signal lines EN and WRITEn are connected to the register 1102 via the pads 408-8 and 408-9. The register 1102 stores control data indicating a magnitude of driving current to be supplied to each light-emitting element 602, for example Starting from the line synchronization signal from the signal line SYNC, the forwarding unit 1003 receives, from the signal line DATAn, input image data that includes a series of pixel values indicating whether or not to cause each one of the light-emitting elements 602 to emit light, synchronously with the clock signal from the signal line CLK. The forwarding unit 1003 performs serial-to-parallel conversion in units of M (e.g., M=4) pixel values for the series of pixel values received serially from the signal line DATAn. For example, the forwarding unit 1003 has four cascaded D flip-flops, and outputs the pixel values DATA-1, DATA-2, DATA-3, and DATA-4 that are input over four clocks to the latch units 1004-001 to 1004-748 in parallel. The forwarding unit 1003 also has another four D flip-flops for delaying the line synchronization signal, and outputs a first latch signal to the latch unit 1004-001 via a signal line LAT1 at a timing delayed for four clocks after the line synchronization signal is input.

A k-th latch unit 1004-*k* (k is an integer from 1 to 748) holds, using a latch circuit, the four pixel values DATA-1, DATA-2, DATA-3, and DATA-4 that are input from the forwarding unit 1003 simultaneously with the input of a k-th latch signal. The k-th latch unit 1004-*k*, except for the last latch unit 1004-748, delays the k-th latch signal for four clocks and outputs a (k+1)-th latch signal to a latch unit 1004-(k+1) via a signal line LAT(k+1). The k-th latch unit 1004-*k* continues to output drive signals based on the four pixel values held by the latch circuit to a current drive unit 1104 during the signal period of the k-th latch signal. For example, there is a delay of four clocks between the timing when the first latch signal is input to the latch unit 1004-1 and the timing when the second latch signal is input to the latch unit 1004-2. Therefore, the latch unit 1004-1 outputs drive signals based on the first, second, third, and fourth pixel values to the current drive unit 1104, while the latch unit 1004-2 outputs drive signals based on the fifth, sixth, seventh, and eighth pixel values to the current drive unit 1104. In general, the latch unit 1004-*k* outputs drive signals based on (4k-3)-th, (4k-2)-th, (4k-1)-th, and (4k)-th pixel values to the current drive unit 1104. Therefore, in the embodiment shown in FIG. 10, the 748 latch units 1004-001 to 1004-748 transmit, substantially in parallel, 2992 drive signals for controlling driving of 2992 (=748*4) light-emitting elements 602 to the current drive unit 1104. Each drive signal is a binary signal that indicates high or low level.

The current drive unit 1104 has 2992 light emission drive circuits respectively corresponding to 2992 light-emitting elements 602, each including a partial region of the light-emitting layer 506. Each light emission drive circuit causes a driving current having a magnitude indicated by control data in the register 1102 to flow to the light-emitting layer 506 of the corresponding light-emitting element 602 while the corresponding drive signal indicates high level meaning that light emission should be ON. As a result, the light-emitting elements 602 emit light at the target amount of light. Note that the control data may indicate one individual current value for each light-emitting element 602, indicate one current value for each group of light-emitting elements 602, or indicate one current value in common to all light-emitting elements 602.

<3. Multiple Exposure Control>

Figure 11:
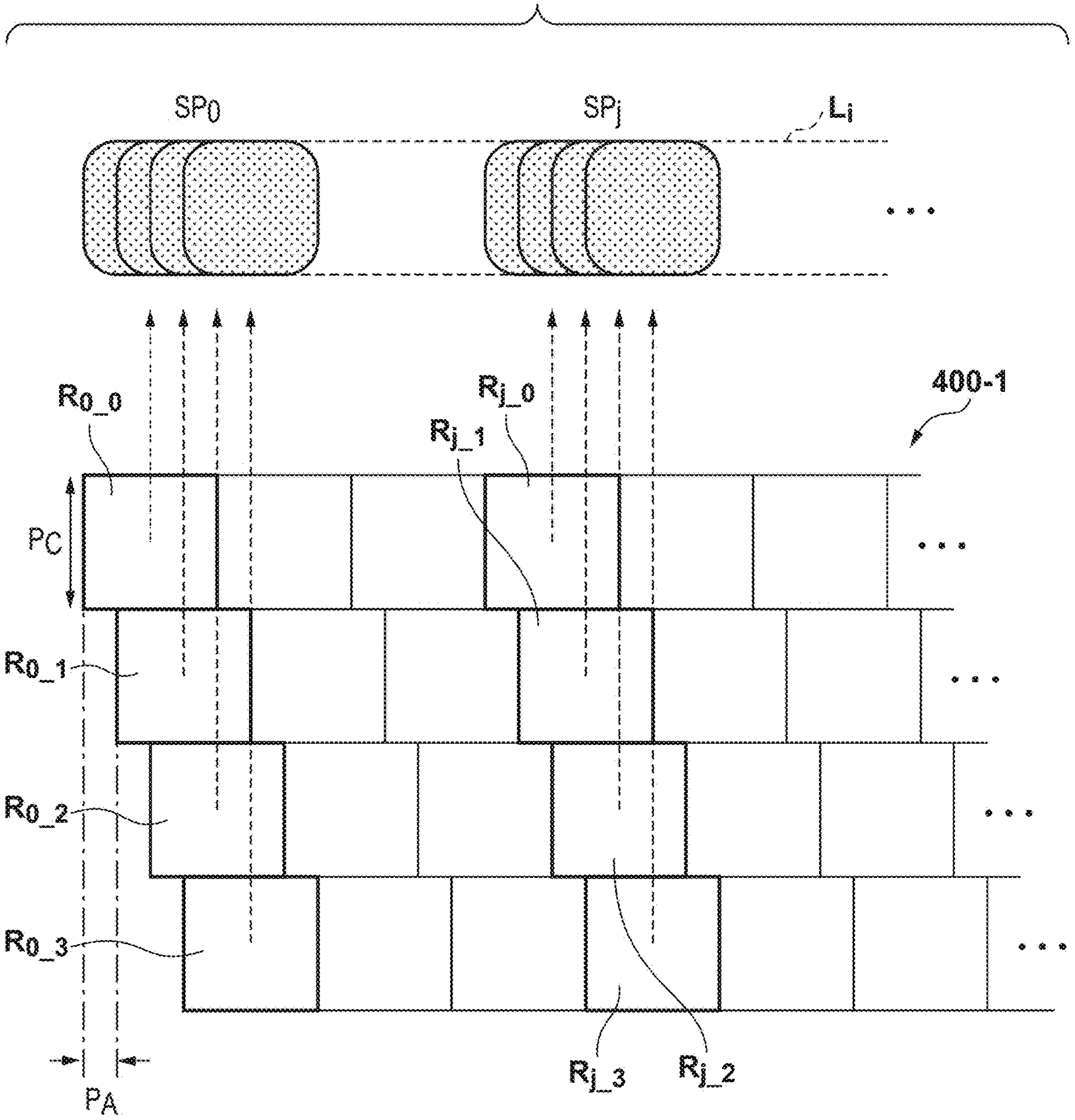
FIG. 11 is an illustrative diagram regarding multiple exposure with light-emitting elements arranged in a staircase pattern.

Although FIG. 4 shows an example where the light-emitting elements 602 are arranged completely in a grid-like pattern in each light-emitting chip 400, the M light-emitting elements 602 of each column may be arranged in a staircase pattern with a constant pitch. FIG. 11 is an illustrative diagram regarding multiple exposure performed with light-emitting elements arranged in a staircase pattern. Here, an example of an arrangement of light-emitting elements in the light-emitting chip 400-1 is partially illustrated where M=4. $R_{j\_m}$ (j={0, 1, . . . , J−1}, m={0, 1, 2, 3}) in the figure represents a light-emitting element 602 in a j-th column from the left in the axial direction and an m-th row from the top in the circumferential direction. The pitch Pc of the light-emitting elements in the circumferential direction may be about 21.16 μm, as mentioned above. The interval in the axial direction between two adjoining light-emitting elements of the M light-emitting elements in each column, that is, the pitch PA of the light-emitting elements in the axial direction may be about 5 μm corresponding to the resolution of 4800 dpi.

As the four light-emitting elements in each column are arranged in the staircase pattern in this manner, any two adjoining light-emitting elements among those four light-emitting elements occupy partially overlapping ranges in the axial direction. The four light-emitting elements in a column corresponding to each pixel position on input image data successively emit light while the photosensitive member 102 rotates, thereby forming a spot corresponding to the pixel position on the surface of the photosensitive member 102. In the example in FIG. 11, when the pixel value at the left end of an i-th line of input image data indicates that light emission should be ON, light-emitting elements $R_{0\_0}$, $R_{0\_1}$, $R_{0\_2}$, and $R_{0\_3}$ successively emit light at timings at which the respective light-emitting elements face a line $L_i$ on the surface of the photosensitive member 102. As a result, the spot region at the left end of the line $L_i$ is subjected to multiple exposure, and a corresponding spot $SP_0$ is formed. Similarly, when a j-th pixel value from the left end of the i-th line of the input image data indicates that light emission should be ON, light-emitting elements $R_{j\_0}$, $R_{j\_1}$, $R_{j\_2}$, and $R_{j\_3}$ successively emit light at timings at which the respective light-emitting elements face the line $L_i$ on the surface of the photosensitive member 102. As a result, a j-th spot region from the left end of the line $L_i$ is subjected to multiple exposure, and a corresponding spot $SP_j$ is formed.

In FIG. 11, the light-emitting elements in adjoining two columns occupy partially overlapping ranges and, likewise, the light-emitting elements in two columns located at a boundary of adjoining two light-emitting chips 400 also occupy partially overlapping ranges in the axial direction. That is, within the adjoining two light-emitting chips 400, the light-emitting elements of the right-end column of the left light-emitting chip 400 and the light-emitting elements of the left-end column of the right light-emitting chip 400 also occupy partially overlapping ranges in the axial direction. The pitch PA of the light-emitting elements in the axial direction is constant at about 5 μm throughout the entire twenty light-emitting chips 400. As a result of four light-emitting elements in each column of these light-emitting chips 400 successively emitting light at appropriate timings, a smooth line of an electrostatic latent image that is constituted by a series of spots with a constant spot interval that partially overlap with each other may be formed on the surface of photosensitive member 102. Then, a two-dimensional electrostatic latent image is produced as a result of such lines being continuously formed in the circumferential direction.

<4. Uniformization of Light Amount>

<4-1. Driving Current Adjustment before Product Shipment>

Figure 12:
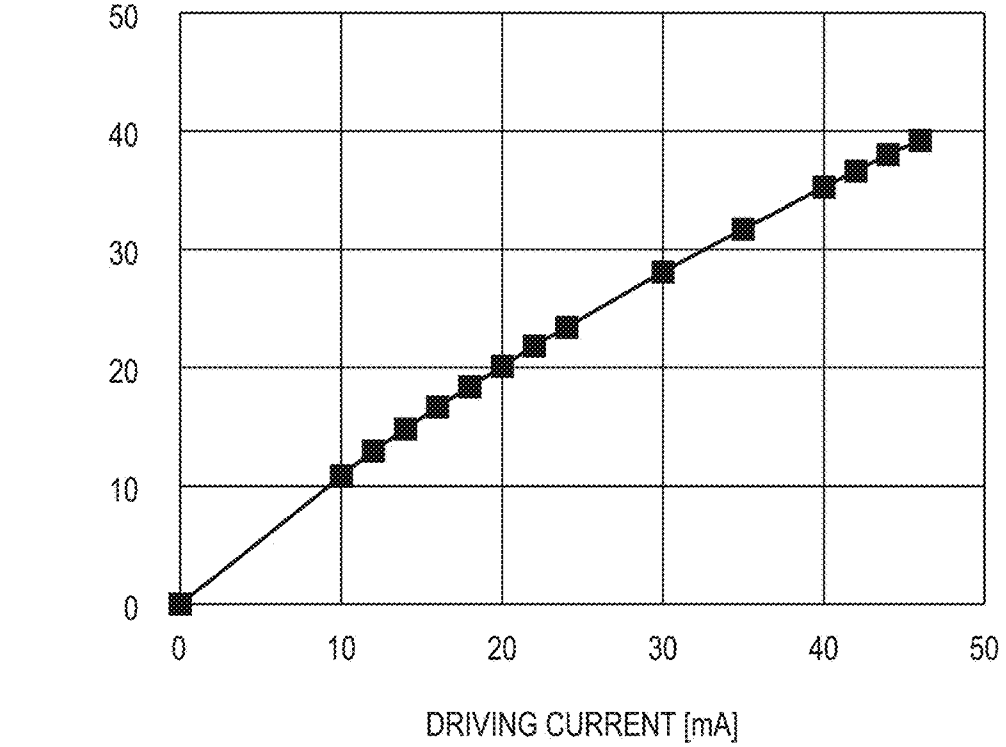
FIG. 12 is a graph illustrating an example of a change in light amount of the light-emitting chip with respect to the change in driving current.
Figure 13:
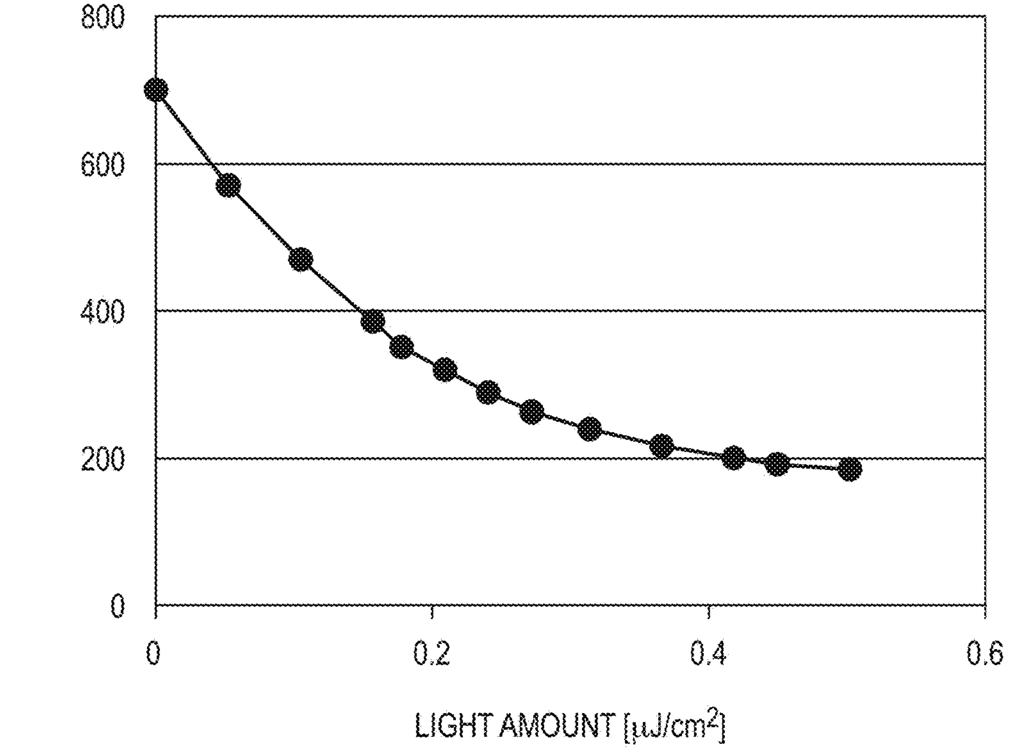
FIG. 13 is a graph illustrating an example of a change in potential of the photosensitive member with respect to a change in light amount of the light-emitting chip.

The amount of light from the light-emitting element array depends on the magnitude of a driving current supplied from the current drive unit 1104. FIG. 12 shows a result of measuring the amount light from the light-emitting chip 400 while the driving current supplied to the light-emitting element 602 of one light-emitting chip 400 is changed from 0 mA to 46 mA. Note that OPTICAL POWER METER 3664 and OPTICAL SENSOR 9742-10 manufactured by Hioki E. E. Corporation was used for the measurement. FIG. 13 shows a change in surface potential of the photosensitive member 102 after the photosensitive member 102 was exposed to light in an amount shown in FIG. 12. If this potential is uniform over a plurality of light-emitting chips 400 arranged parallel to the axial direction of the photosensitive member 102, the density unevenness would not occur in a print image, but in actuality, the unevenness in amount of light from the light-emitting element array may cause a density unevenness in a print image.

Manufacturing variation in the light-emitting elements 602, shifts in arrangement of the light-emitting chips 400, and variation in lenses in the rod lens array 203 are examples of the causes of the light amount unevenness. The light amount unevenness due to these causes is measured at a factory before a product is shipped, and setting values of the driving current for uniformizing the light amount by compensating for the measurement result are written into a memory or a register of the product. The adjustment of the driving current may include a coarse adjustment in units of a light-emitting chip, and a fine adjustment in units of a light-emitting element.

<4-2. Influence of Temperature during Operation>

However, in order to uniformize the light amount, only the adjustment based on the measurement result of the light amount unevenness before product shipment is not sufficient. The reason is that light amount output from light-emitting elements has a characteristic of depending on the temperature, and if the temperature during operation differs, the output light amount also differs.

Figure 14:
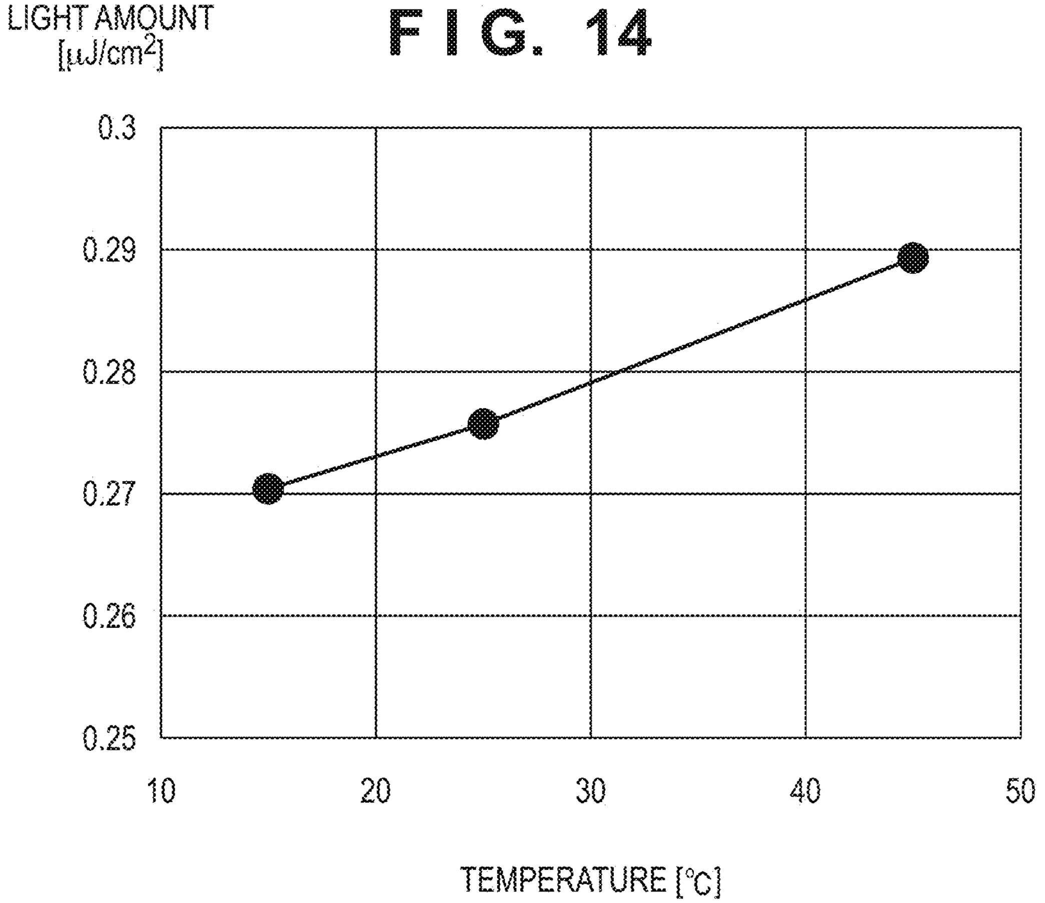
FIG. 14 is a graph illustrating an example of relationship between an operating temperature and an output light amount of the organic EL element.

In general, inorganic EL elements including light-emitting thyristors have a characteristic in which the light amount decreases as the temperature increases, because the amount of recombination between holes and electrons not contributing to light emission increases. In contrast, organic EL elements have a characteristic in which the light amount increases as the temperature increases because the light emission efficiency of an organic film increases. FIG. 14 illustrates an example of relationship between the operating temperature and the output light amount of an organic EL element. According to the graph in FIG. 14, an organic EL element that outputs light in an amount of 0.27 μJ/cm$^2$ when the operating temperature is 15° C. outputs light in an amount of 0.29 μJ/cm$^2$ at the operating temperature of 45° C.

In the exposure head 106, the temperatures of the light-emitting chips 400 or the light-emitting elements 602 during operation are not uniform. If the proportion of pixels that are turned on to emit light (hereinafter, simply referred also to as an "image ratio") is high in one light-emitting chip 400, the temperature of this light-emitting chip becomes higher than another light-emitting chip 400 whose image ratio is low. Also, the influence received from another heat source (e.g., fixing unit 104) in the apparatus differs depending on the chip position in the light-emitting element array.

Figure 15:
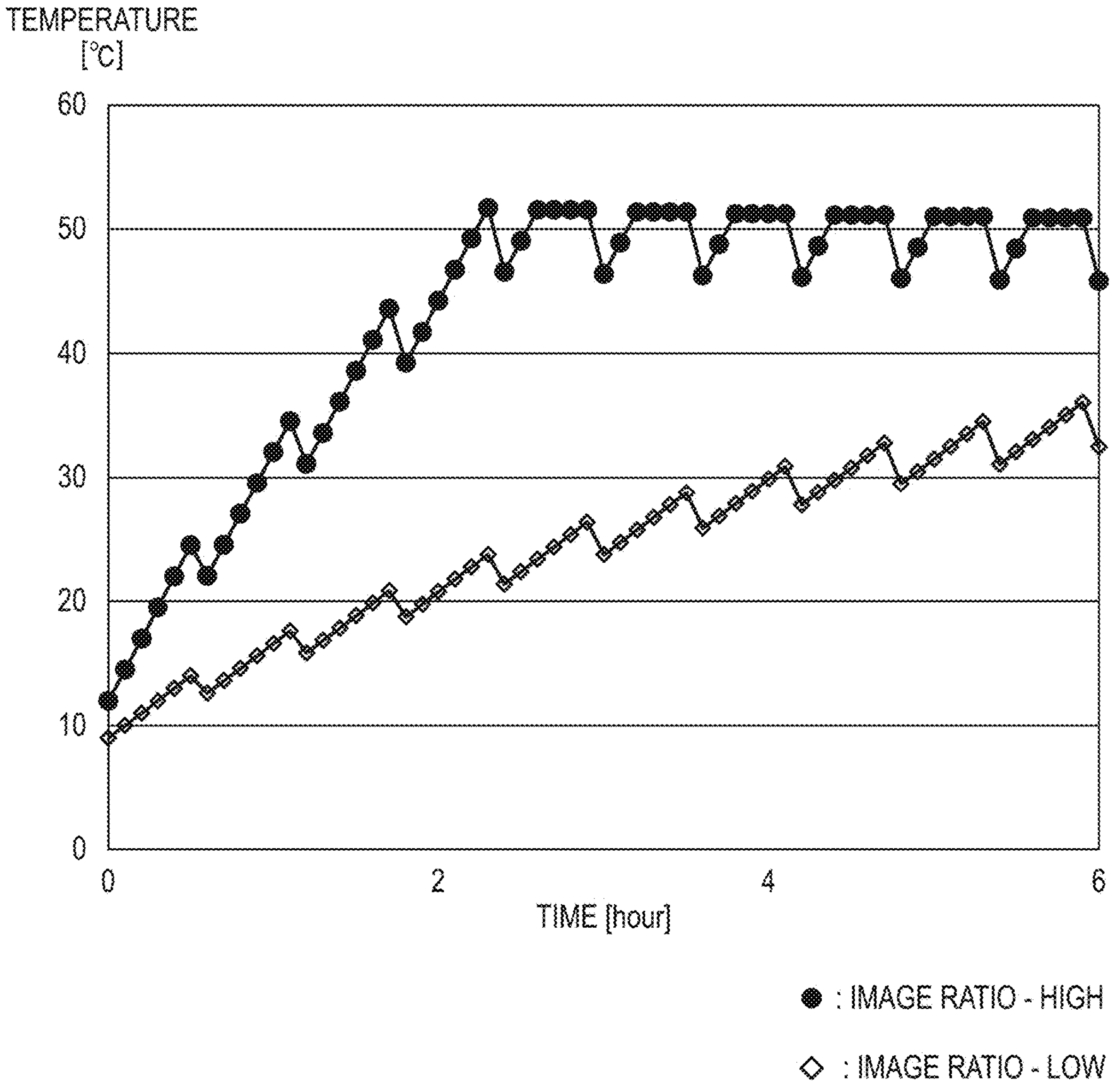
FIG. 15 is a graph illustrating an example of a change over time in operating temperatures of two light-emitting chips along a progress of the image formation operation.

FIG. 15 is a graph illustrating an example of a change over time in operating temperatures of two light-emitting chips of the exposure head 106 along a progress of an image formation operation under certain conditions. Here, it is assumed that execution of a print job for printing 1800 pages at a print speed of 70 ppm is repeated for over six hours with intervals of six minutes between jobs (operation stop). The environmental temperature is about 10° C. The circular markers in the diagram are temperature plots of the light-emitting chip 400-1, and the rectangular markers are temperature plots of the light-emitting chip 400-10. The light-emitting chip 400-1 is located at the left end of the light-emitting element array, and it is assumed that the image ratio is 50% in an image formation range of the light-emitting chip 400-1. On the other hand, the light-emitting chip 400-10 is located at almost the center of the light-emitting element array, and it is assumed that the image ratio is 25% in an image formation range of the light-emitting chip 400-10.

As it appears in the graph in FIG. 15, the temperature of the light-emitting chip 400-1 increases at a high increase rate during operation because the integrated current amount increases due to the high image ratio. The heat received from the main body of the image-forming apparatus 1 also contributes to the temperature increase of the light-emitting chip 400-1. Cooling of the light-emitting chip 400-1 in the intervals between jobs is not sufficient, and at a point in time at which two hours has elapsed from the measurement start, the temperature of the light-emitting chip 400-1 reaches 50° C. On the other hand, the temperature of the light-emitting chip 400-10 increases at a relatively low increase rate during operation due to the relatively low image ratio. It is also likely that the influence of heat from the main body of the image-forming apparatus 1 is relatively small in the light-emitting chip 400-10, compared with the light-emitting chip 400-1. The temperature of the light-emitting chip 400-10 at a point in time at which two hours has elapsed from the measurement start is about 20° C., and thereafter the temperature of the light-emitting chip 400-10 also gradually increases.

Figure 16:
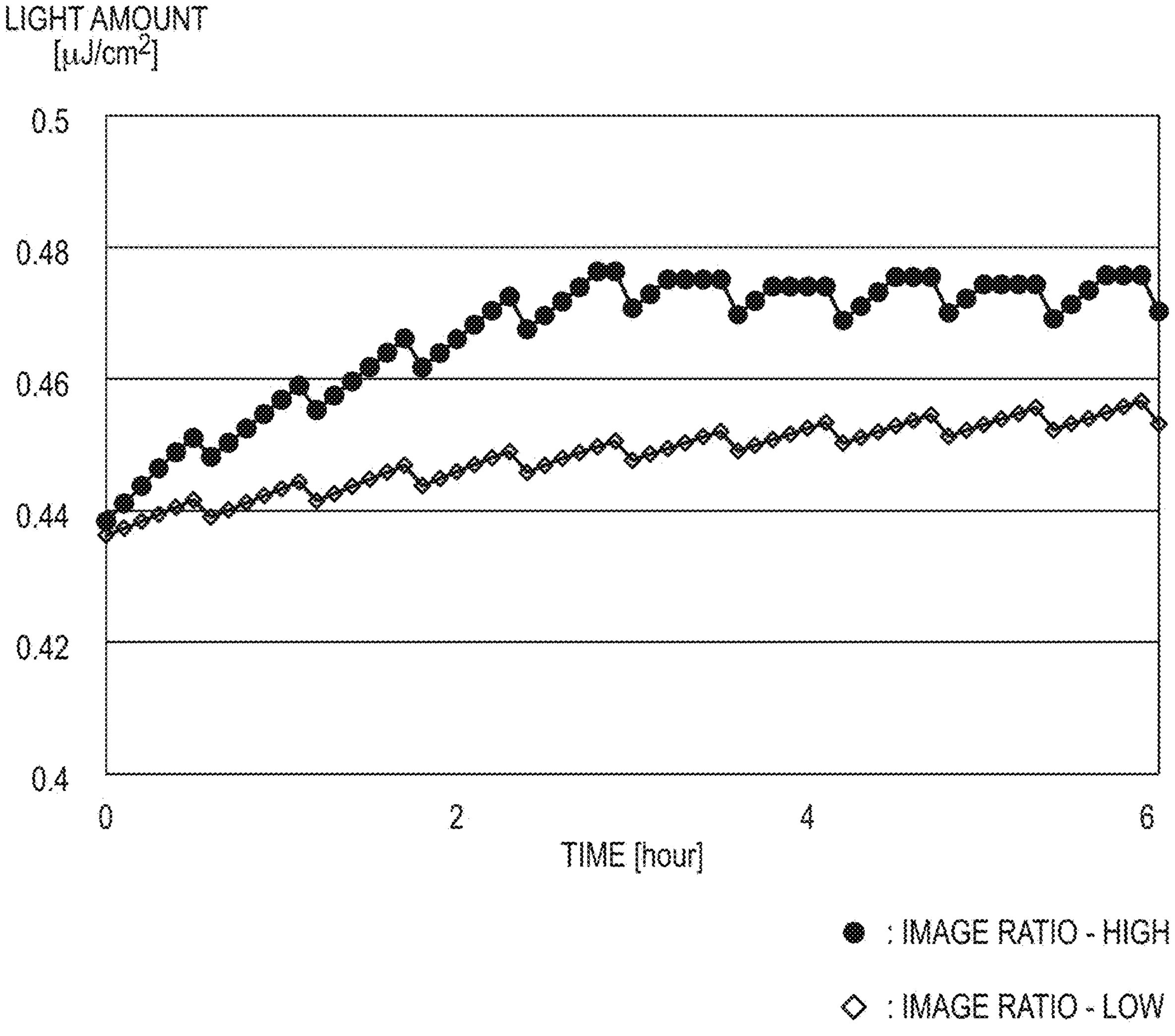
FIG. 16 is a graph illustrating an example of a change over time in output light amounts of two light-emitting chips along a progress of the image formation operation.

In almost entire measurement period shown in FIG. 15, there is a gap between the temperature of the light-emitting chip 400-1 and the temperature of the light-emitting chip 400-10. As a result, if the driving currents supplied to the light-emitting chips 400-1 and 400-10 are the same, the output light amounts of these chips differ due to the temperature-light amount characteristic of the organic EL elements, and therefore light amount unevenness occurs, which causes a density unevenness. FIG. 16 is a graph illustrating an example of a change over time in output light amounts of the two light-emitting chips 400-1 and 400-10, which corresponds to the change over time in operating temperature in FIG. 15.

<4-3. Dynamical Adjustment of Driving Current based on Predicted Temperature>

It may conceivable that a temperature sensor is provided for each light-emitting chip 400, and the light amount unevenness is prevented by adjusting the driving current of the light-emitting chip 400 based on the measured temperature. However, there is a demerit, in the additional mounting of the temperature sensors, that the manufacturing cost increases and reduction in size is hindered. Therefore, in the present embodiment, instead of directly measuring the temperature of each light-emitting chip 400, a mechanism for determining, predicting or estimating the temperature of the light-emitting chip 400 is incorporated.

Specifically, the CPU 701 of the image controller 700 functions as control means for predicting the temperature, during operation, of each light-emitting chip 400, and controlling the driving current supplied to the light-emitting elements 602 of the light-emitting chip 400 based on the predicted temperature. Based on the temperature-light amount characteristic of the organic EL elements, the CPU 701 sets the driving current supplied to the light-emitting elements 602 of a light-emitting chip 400 having a higher predicted temperature to be lower than a driving current supplied to the light-emitting elements 602 of a light-emitting chip 400 having a lower predicted temperature. For example, the CPU 701 controls a first driving current to be supplied to the light-emitting elements 602 of a first light-emitting chip 400 and a second driving current to be supplied to the light-emitting elements 602 of a second light-emitting chip 400, where the first driving current is lower than the second driving current when the first temperature of the first light-emitting chip 400 is determined or predicted to be higher than the second temperature of the second light-emitting chip 400.

The CPU 701 maintains a variable Tn (n=1, . . . , 20) that indicates the temperature of the light-emitting chip 400-*n* in the memory 706, for example. Then, the CPU 701 dynamically (e.g., periodically) updates the temperature variable Tn in accordance with a temperature prediction model so as to track the change in temperature of the light-emitting chip 400-*n* during operation of the exposure head 106.

Typically, the temperature prediction model may include a temperature increase during operation and a temperature decrease during non-operation of the exposure head 106.

The temperature increase may be calculated by multiplying a parameter related to the amount of operation of the light-emitting chip 400 by a temperature increase coefficient α. The parameter related to the amount of operation of the light-emitting chip 400 may be a duration in which the light-emitting chip 400 has been used for an image formation operation (hereinafter, referred to as a "duration of operation") or the number of times the light-emitting chip 400 has been used for image formation operation (hereinafter, referred to as a "number of operations"), for example.

Note that, even if the light-emitting chip 400 has operated in the same duration (or the same number of times), if the ratio of the light-emitting elements 602 that have emitted light differs, the heat generation amount differs. The temperature increase coefficient α is for reflecting this difference. For example, the CPU 701 calculates an image ratio Rn for each light-emitting chip 400 based on input image data, for example. The image ratio Rn represents a proportion of light-emitting elements that emit light for each light-emitting chip, and may be calculated as a proportion of pixels whose pixel values indicate that light emission is ON out of all of the pixels in the same chip, for example. Then, the CPU 701 may determine the temperature increase coefficient (first coefficient) an to be used to calculate the temperature increase of the light-emitting chip 400-*n*, based on the image ratio Rn calculated for the light-emitting chip 400-*n*. The relationship between the image ratio and the temperature increase coefficient is determined in a test before product shipment and is stored in the memory 706 in a format of a relational expression or a look-up table (LUT). The following Table 1 shows an example of the relationship between the image ratio [%] of a light-emitting chip and the temperature increase coefficient by which the duration of operation [hour] of the light-emitting chip is multiplied.

TABLE 1

Relationship between image ratio and temperature increase coefficient

| Image Ratio [%] | Temperature Increase Coefficient [° C./hour] |
|---|---|
| 100 | 40 |
| 50 | 25 |
| 25 | 10 |
| 1 | 1 |
| 0 | 1 |

Note that the relationship between the image ratio and the temperature increase coefficient may also be defined so as to vary depending on the position of the light-emitting chip 400 in the light-emitting element array. For example, when the image ratio is the same, the relational expression or LUT for each chip position may also be defined such that the temperature increase coefficient an is larger for a chip that is located at an array end portion at which the influence from another heat source in the apparatus is likely to be received, relative to a chip that is located at an array central portion. The following Table 2 shows an example of the relationship between the image ratio of a light-emitting chip and the temperature increase coefficient, which depends on the chip position. With respect to a chip at an intermediate chip position, one of the temperature increase coefficients shown in the table may be selected, or an intermediate temperature increase coefficient may be calculated by interpolation.

TABLE 2

Chip position-dependent relationship between image ratio and temperature increase coefficient

| Image | Temperature Increase Coefficient [° C./hour] | |
|---|---|---|
| Ratio [%] | End Portion | Central Portion |
| 100 | 40 | 32 |
| 50 | 25 | 20 |
| 25 | 10 | 8 |
| 1 | 1 | 1 |
| 0 | 1 | 1 |

Alternatively, the temperature increase of each light-emitting chip 400 may be calculated based on the number of bits indicating a specific value counted within a corresponding part of the image data output to that light-emitting chip 400. For example, the CPU 701 may count the number of bits indicating the first value (indicating that a light-emitting element 602 should be turned on) in a first part of the image data output to the first light-emitting chip 400, the number bits indicating the first value in a second part of the image data output to the second light-emitting chip 400, and so on. In this example, the counted number of bits being larger (i.e., the image ratio being higher) means that the calculated temperature increase is larger. The CPU 701 may determine the temperature increases from the counted numbers of bits for the light-emitting chips 400, and control the respective driving currents based thereon by outputting corresponding control signals to the light-emitting chips 400 (e.g., a first control signal indicating a first driving current to the first light-emitting chip 400, a second control signal indicating a second driving current to the second light-emitting chip 400, and so on).

In an example, each driving current may be determined directly from the total number of bits indicating the first value in a part of the image data output to the corresponding light-emitting chip 400 (in this case, the temperature or temperature increase for each light-emitting chip 400 is not explicitly determined). In another example, a temperature for each light-emitting chip 400 may be calculated using the temperature increase determined based on a product between the counted number of bits and a specific coefficient, and the driving current may be determined from the calculated temperature. The coefficient used here may be a predetermined fixed value, or a variable value determined based on a position of each light-emitting chip 400 in the axial direction D1.

As described earlier, according to the temperature-light amount characteristic of organic EL elements, the amount of light emitted from an element increases as the temperature of the element increases. Hence, when a first temperature predicted for the first light-emitting chip 400 is higher than a second temperature predicted for the second light-emitting chip 400, the CPU 701 sets, by the first control signal, the first driving current supplied in the first light-emitting chip 400 to be lower than the second driving current supplied in the second light-emitting chip 400 set by the second control signal. Likewise, when the first temperature predicted for the first light-emitting chip 400 is lower than the second temperature predicted for the second light-emitting chip 400, the CPU 701 sets, by the first control signal, the first driving current supplied in the first light-emitting chip 400 to be higher than the second driving current supplied in the second light-emitting chip 400 set by the second control signal. In any case, the temperature may be calculated further based on the temperature decrease described next.

The temperature decrease may be calculated by multiplying the elapsed time from the last operation of the light-emitting chip 400 (hereinafter, referred also to as a "standing time") by a temperature decrease coefficient β. One example may be such that the temperature decrease coefficient β is 9 [° C./hour]. Here, in a period during which the exposure head 106 does not operate, the temperature of each light-emitting chip 400 may decrease faster as the environmental temperature is lower. Therefore, the CPU 701 may determine the temperature decrease coefficient β based on the environmental temperature measured by the temperature sensor 708. Also, if the standing time of each light-emitting chip 400 exceeds a predetermined threshold, the CPU 701 may determine that a sufficient time for the chip temperature becoming the same as the environmental temperature has elapsed, and reset the predicted temperature of the light-emitting chip 400 to an environmental temperature measured by the temperature sensor 708. The memory 706 may store the relationship between the environmental temperature and the temperature decrease coefficient (second coefficient) in advance.

When the exposure head 106 operates for an image formation operation, the CPU 701 dynamically updates the temperature variable Tn of each light-emitting chip 400-*n* in accordance with the temperature prediction model described above. For example, the CPU 701 subtracts the temperature decrease in a standing time that may be calculated using the temperature decrease coefficient β from the temperature variable Tn that has been updated at the time of previous operation. Also, during the image formation operation progresses, the CPU 701 periodically adds the temperature increase calculated using the temperature increase coefficient an to the temperature variable Tn. The CPU 701 determines the value of driving current to be supplied to each light-emitting chip 400-*n* based on the predicted temperature that is tracked in this way, and writes the determined value of driving current to the register of the light-emitting chip 400-*n*.

The following Table 3 shows examples of relationship between combinations of temperature [° C.] and driving current [mA] of a light-emitting chip 400 and an output light amount [μJ/cm$^2$] of the light-emitting chip 400.

TABLE 3

Examples of an output light amount of light-emitting chip corresponding to combinations of chip temperature and driving current

| Chip | Driving Current [mA] | | | |
|---|---|---|---|---|
| Temperature [° C.] | 0 | 20 | 40 | 60 |
| 0 | 0.00 | 0.26 | 0.52 | 0.78 |
| 30 | 0.00 | 0.28 | 0.56 | 0.84 |
| 60 | 0.00 | 0.30 | 0.59 | 0.89 |
| 100 | 0.00 | 0.32 | 0.64 | 0.96 |

The relational expression or LUT representing the correspondence relationship as shown in the table above is determined in a test before product shipment and stored in the memory 706. The CPU 701 can determine the value of a driving current indicating a given target light amount at a predicted temperature Tn of each light-emitting chip 400, by searching the LUT as Table 3, for example. When the predicted temperature of the light-emitting chip 400-1 is 30° C. and the target light amount is 0.56 μJ/cm$^2$, for example, the value of a driving current to be set for the light-emitting chip 400-1 is 40 mA. For an intermediate chip temperature or output light amount that does not match any of the entries in the table, the CPU 701 may determine the value of a driving current by interpolation (e.g., linear interpolation) based on values indicated by a plurality of entries.

Figure 17:
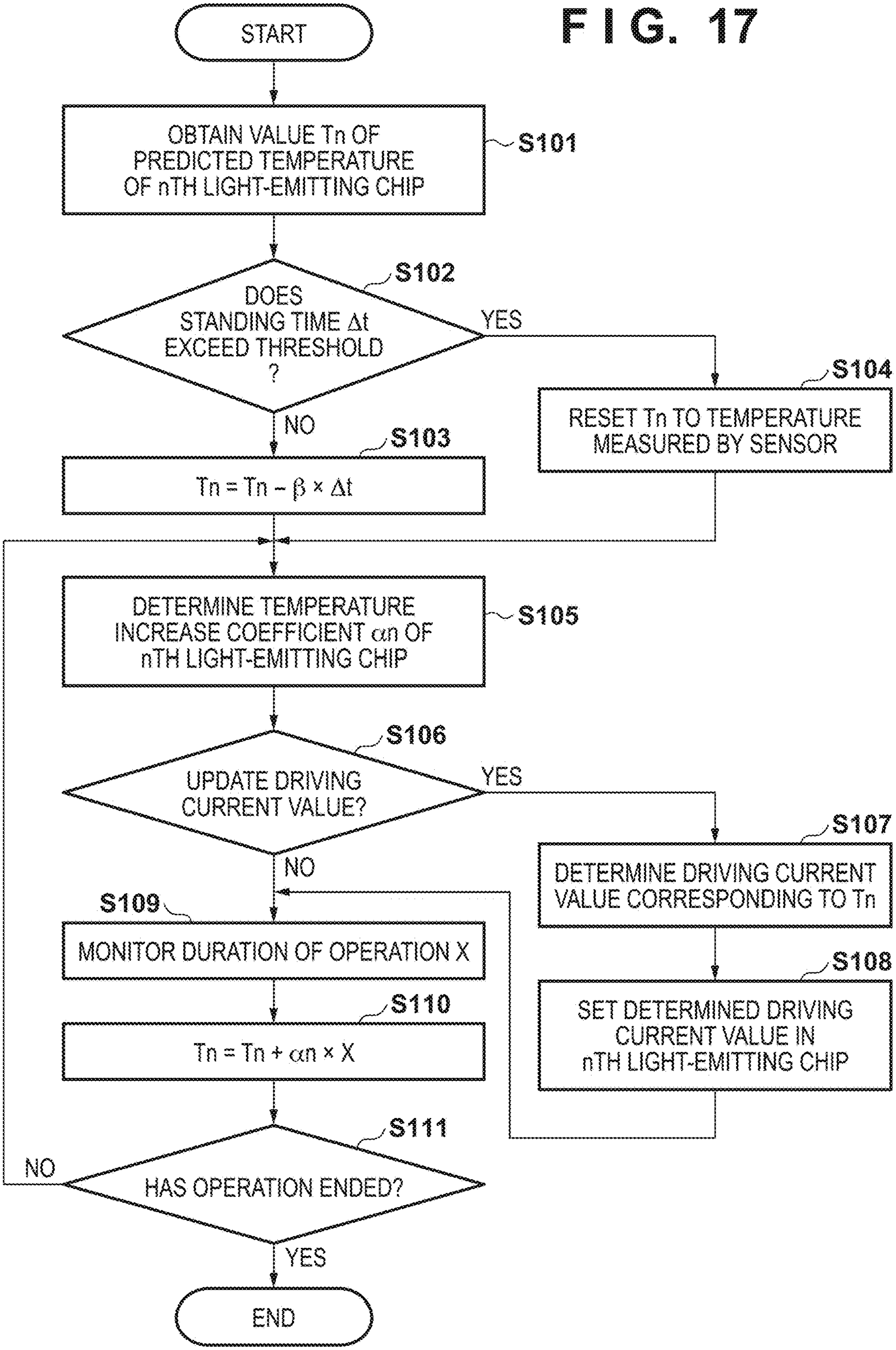
FIG. 17 is a flowchart illustrating an example of a flow of power adjustment processing according to an embodiment.

FIG. 17 is a flowchart illustrating an example of a flow of power adjustment processing that may be executed by the CPU 701. Here, the example of the flow of processing is described in which, focusing on an n-th light-emitting chip 400, the driving current supplied to the light-emitting chip 400 is dynamically adjusted. In actuality, for the twenty light-emitting chips 400-1 to 400-20, similar temperature prediction and driving current adjustment may be performed in parallel.

First, in step S101, when an execution of a print job is started, the CPU 701 obtains a value of the predicted temperature of the n-th light-emitting chip 400 (temperature variable) In from the memory 706. Next, in step S102, the CPU 701 determines whether or not the standing time Δt from the previous operation exceeds a predetermined threshold (e.g., seven hours). If the standing time Δt does not exceed the threshold, the processing is advanced to step S103. On the other hand, if the standing time Δt exceeds the threshold, the processing is advanced to step S104.

In step S103, the CPU 701 subtracts a temperature decrease equivalent to the product between the standing time Δt and the temperature decrease coefficient β from a predicted temperature Tn. On the other hand, in step S104, the CPU 701 resets the predicted temperature Tn to an environmental temperature measured by the temperature sensor 708. Note that, in step S103 as well, if the predicted temperature Tn after subtraction is below the environmental temperature, the CPU 701 may reset the predicted temperature Tn to the environmental temperature.

Next, in step S105, the CPU 701 determines the temperature increase coefficient an to be used for prediction of the temperature of the n-th light-emitting chip 400. For example, the CPU 701 may calculate the image ratio in an image formation range of the light-emitting chip 400 based on input image data, and determine the temperature increase coefficient an from the calculated image ratio.

Next, in step S106, the CPU 701 determines whether or not the driving current value of the n-th light-emitting chip 400 is to be updated based on the latest predicted temperature Tn. For example, when the execution of a print job is started, the CPU 701 may determine that the driving current value is to be updated. Also, when the change in the predicted temperature Tn from when the driving current value was updated previous time exceeds a predetermined threshold, the CPU 701 may determine that the driving current value of the n-th light-emitting chip 400 is to be updated. Frequent update of the driving current value causes an increase in the delay of the image formation operation, and therefore the reduction in productivity caused by an operation delay can be prevented by omitting the update of the driving current value when the change in the predicted temperature Tn is small. If the driving current value is to be updated, the processing advances to step S107. On the other hand, if the driving current value is not to be updated, the processing advances to step S109.

In step S107, the CPU 701 determines the driving current value for outputting light of a target amount, which corresponds to the latest predicted temperature Tn of the n-th light-emitting chip 400, by referencing the relational expression or LUT stored in the memory 706. Next, in step S108, the CPU 701 sets the determined driving current value in the n-th light-emitting chip 400 (writes control data indicating the driving current value to the register of the n-th light-emitting chip 400).

Once the execution of a print job is started, the CPU 701 repeats, at a fixed control cycle, monitoring of factors contributing to an increase in temperature of the light-emitting chip 400 and updating of the predicted temperature Tn. For example, in step S109, the CPU 701 monitors the duration of operation X of the light-emitting chip 400 using a timer 707. Next, in step S110, the CPU 701 adds a temperature increase equivalent to the product between the temperature increase coefficient an and the duration of operation X to the predicted temperature Tn. Next, in step S111, the CPU 701 determines whether or not the operation of the exposure head 106 has ended. If the operation of the exposure head 106 is not ended, the processing returns to step S105, and the temperature increase coefficient an may be determined again and the driving current value may be updated, as needed.

In step S111, if it is determined that the operation of the exposure head 106 has ended, the CPU 701 records the latest value of the predicted temperature Tn of the n-th light-emitting chip 400 in the memory 706 along with the final update time, and the power adjustment processing in FIG. 17 ends.

Figure 18:
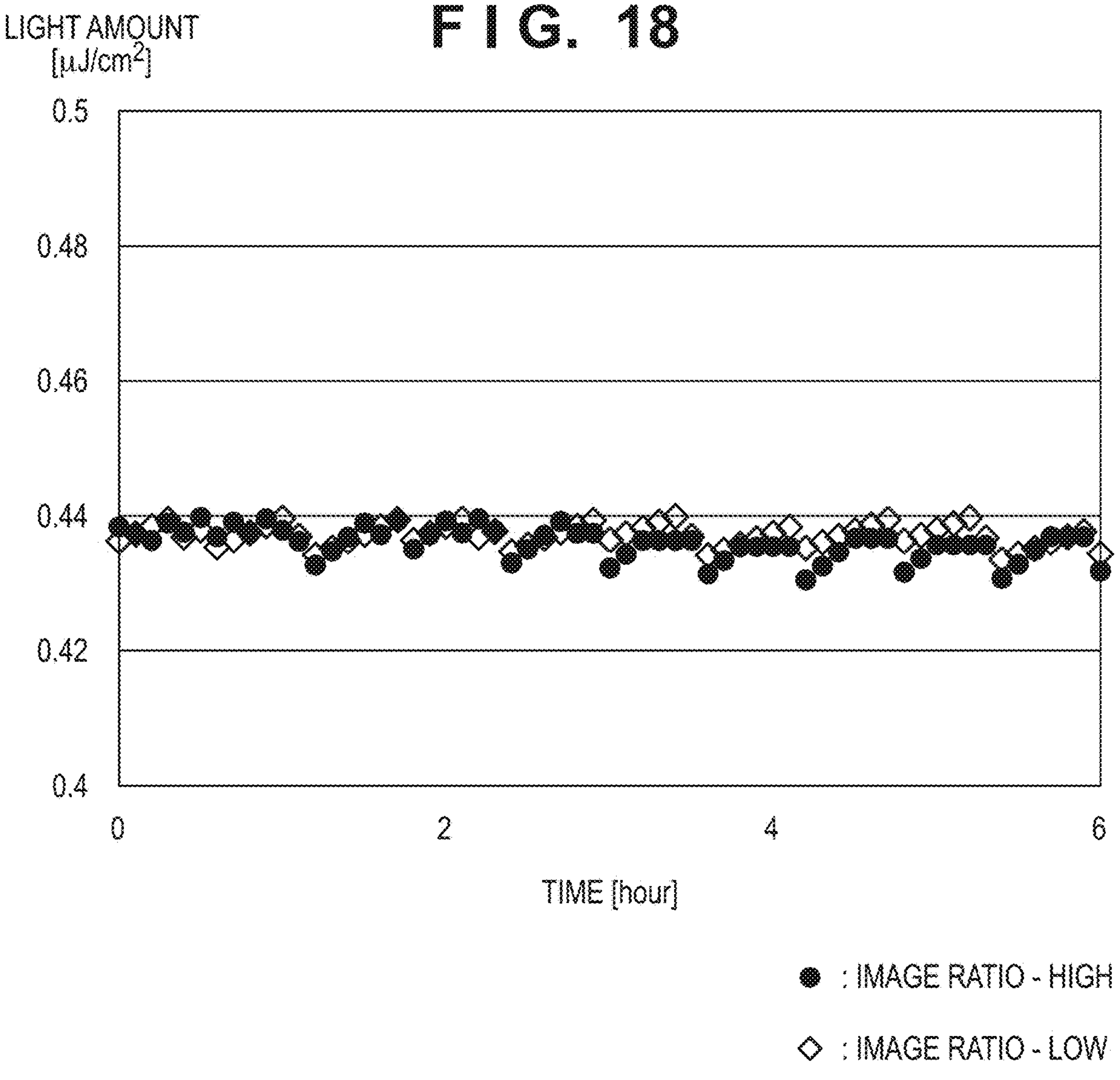
FIG. 18 is a graph illustrating an example of a change over time in output light amounts of two light-emitting chips that are uniformized as a result of the power adjustment processing.

FIG. 18 shows an example of a change over time in output light amounts of the two light-emitting chips 400-1 and 400-10 when the dynamic power adjustment processing described above has been applied while performing image formation operation under the similar conditions as in FIGS. 15 and 16. Compared with FIG. 16, in FIG. 18, the output light amounts of the light-emitting chip 400-1 having a relatively high image ratio and the light-emitting chip 400-10 having a relatively low image ratio are uniformized over the entire duration of operation. This is because the driving currents supplied to the respective chips are reduced in order to suppress increases in the light amounts caused by individual temperature increases in the light-emitting chips 400-1 and 400-10. As a result, the in-plane unevenness in light amount of the light-emitting element array 201 is suppressed, and high-quality images with small density unevenness can be printed.

Note that the temperature prediction model described in this section is merely an example. In one modification, the temperature measured by the temperature sensor 708 is fed back to the power adjustment processing described using FIG. 17, and with this, the predicted temperature may be further refined. In another modification, instead of calculating the temperature increase by multiply the duration of operation or number of operations of each light-emitting chip 400 by the temperature increase coefficient, the temperature increase may alternatively be calculated based on an integrated value of the driving current amount of the light-emitting chip 400.

Also, in step S106 in FIG. 17, whether or not the driving current value is to be updated may alternatively be determined based on a difference in image ratio among the light-emitting chips 400. For example, when the difference in image ratio among the light-emitting chips 400 exceeds a predetermined threshold, which is a situation in which the light amount unevenness easily appears, the CPU 701 may therefore set the update frequency of the driving current value to a higher value relative to the case where the difference in image ratio does not exceed the predetermined threshold. As a result, an appropriate balance between the image quality and the productivity can be achieved.

5. Summary

Various embodiments of techniques according to the present disclosure have been described above using FIGS. 1 to 18. In the embodiments described above, in an exposure apparatus in which a photosensitive member is exposed using an array of organic EL elements constituted by a plurality of light-emitting chips, the driving current supplied to organic EL elements of each light-emitting chip is controlled based on the temperature during operation predicted for the light-emitting chip. Also, the driving current supplied to the organic EL elements of a light-emitting chip having a higher predicted temperature is set to be lower than the driving current supplied to the organic EL elements of a light-emitting chip having a lower predicted temperature. According to such a configuration, the temperature-light amount characteristic intrinsic to the organic EL elements in which the output light amount increases as the temperature increases is appropriately considered, and with this, the light amount unevenness between light-emitting chips due to the change in the temperature during operation can be suppressed, and the degradation in image quality can be avoided.

In the embodiments described above, a variable indicating the predicted temperature may be maintained for each light-emitting chip, and the temperature increase derived by multiplying the duration of operation or the number of operations of the light-emitting chip by a first coefficient may be added to the variable. As a result of tracking the temperature increase of each light-emitting chip in this manner, the temperature of the light-emitting chip can be simply predicted without providing a temperature sensor to each of the plurality of light-emitting chips. Also, as a result of determining the first coefficient based on the proportion of light-emitting elements that emit light (that is, image ratio) for each light-emitting chip, the temperature change that may differ for each light-emitting chip can be accurately tracked. Moreover, as a result of determining the first coefficient based on the chip position in the light-emitting element array, the temperature change that may differ for each light-emitting chip can be tracked with more favorable accuracy, in which the influence received from another heat source in the apparatus is taken into consideration.

In the embodiments described above, the temperature decrease derived by multiplying the elapsed time from the last operation of each light-emitting chip by a second coefficient may be subtracted from the variable. When the elapsed time from the last operation of each light-emitting chip exceeds a predetermined threshold, the predicted temperature of the light-emitting chip may be reset to an environmental temperature. According to such a configuration, the temperature decrease in an interval between operations of the apparatus can be appropriately reflected in the predicted temperature of each light-emitting chip.

Although some specific numerical values have been used for explanations in this specification, these specific numerical values are mere examples, and the present invention is not limited to these specific numerical values used in the embodiments. Specifically, the number of light-emitting chips provided on one printed circuit board is not limited to twenty, and may be any number that is one or more. The size of the light-emitting element array in each light-emitting chip 400 is not limited to four rows×748 columns, and may be any other size. The pitch in the circumferential direction and the pitch in the axial direction of the light-emitting elements are not limited to about 21.16 μm and about 5 μm, and may take any other values.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-123760, filed on Jul. 28, 2023 which is hereby incorporated by reference herein in its entirety.

What is claimed is:

1. An exposure apparatus for exposing a photosensitive member with light, the exposure apparatus comprising:

a first light-emitting chip that includes a plurality of first light-emitting portions arranged along an axial direction of the photosensitive member and is configured to supply a first driving current to the plurality of first light-emitting portions;

a second light-emitting chip, arranged at a different position from the first light-emitting chip in the axial direction, that includes a plurality of second light-emitting portions arranged along the axial direction and is configured to supply a second driving current to the plurality of second light-emitting portions; and a control unit configured to output image data that is a set of binary bits each indicating a first value or a second value, wherein a first part of the image data is output to the first light-emitting chip and a second part of the image data is output to the second light-emitting chip, and the control unit is configured to:

control the first driving current based on the number of bits indicating the first value in the first part of the image data; and control the second driving current based on the number of bits indicating the first value in the second part of the image data.

2. The exposure apparatus according to claim 1, wherein the first value indicates that a corresponding one of the plurality of first light-emitting portions and the plurality of second light-emitting portions should be turned on, and the second value indicates that a corresponding one of the plurality of first light-emitting portions and the plurality of second light-emitting portions should be turned off.

3. The exposure apparatus according to claim 1, wherein the first value indicates that a corresponding one of the plurality of first light-emitting portions and the plurality of second light-emitting portions should be turned off, and the second value indicates that a corresponding one of the plurality of first light-emitting portions and the plurality of second light-emitting portions should be turned on.

4. The exposure apparatus according to claim 1, wherein the control unit is configured to:

control the first driving current based on the total number of bits indicating the first value in the first part; and control the second driving current based on the total number of bits indicating the first value in the second part.

5. The exposure apparatus according to claim 1, wherein the control unit is configured to:

control the first driving current based on a first temperature of the first light-emitting chip determined based on the number of bits indicating the first value in the first part; and control the second driving current based on a second temperature of the second light-emitting chip determined based on the number of bits indicating the first value in the second part.

6. The exposure apparatus according to claim 5, wherein, when the first temperature is higher than the second temperature, the control unit is configured to output, to the first light-emitting chip, a first control signal that sets the first driving current to be lower than the second driving current.

7. The exposure apparatus according to claim 5, wherein, when the first temperature is higher than the second temperature, the control unit is configured to output, to the second light-emitting chip, a second control signal that sets the second driving current to be higher than the first driving current.

8. The exposure apparatus according to claim 5, wherein the first temperature is calculated based on a product between the number of bits indicating the first value in the first part and a first coefficient, and the second temperature is calculated based on a product between the number of bits indicating the first value in the second part and a second coefficient.

9. The exposure apparatus according to claim 8, wherein the control unit is configured to determine the first coefficient based on a position of the first light-emitting chip in the axial direction, and determine the second coefficient based on a position of the second light-emitting chip in the axial direction.

10. The exposure apparatus according to claim 5, wherein the first temperature is calculated further based on elapsed time since last operation of the plurality of first light-emitting portions, and the second temperature is calculated further based on elapsed time since last operation of the plurality of second light-emitting portions.

11. The exposure apparatus according to claim 1, wherein the exposure apparatus comprises a plurality of light-emitting chips each having a plurality of light-emitting portions arranged along the axial direction and configured to supply a driving current to the plurality of light-emitting portions, and the plurality of light-emitting chips include the first light-emitting chip and the second light-emitting chip.

12. The exposure apparatus according to claim 1, wherein the plurality of first light-emitting portions and the plurality of second light-emitting portions are organic electro-luminescence, EL, elements.

13. An image-forming apparatus comprising:

a photosensitive member; and an exposure apparatus for exposing the photosensitive member with light, wherein the exposure apparatus includes:

a first light-emitting chip that includes a plurality of first light-emitting portions arranged along an axial direction of the photosensitive member and is configured to supply a first driving current to the plurality of first light-emitting portions;

a second light-emitting chip, arranged at a different position from the first light-emitting chip in the axial direction, that includes a plurality of second light-emitting portions arranged along the axial direction and is configured to supply a second driving current to the plurality of second light-emitting portions; and a control unit configured to output image data that is a set of binary bits each indicating a first value or a second value, wherein a first part of the image data is output to the first light-emitting chip and a second part of the image data is output to the second light-emitting chip, and the control unit is configured to:

control the first driving current based on the number of bits indicating the first value in the first part of the image data; and control the second driving current based on the number of bits indicating the first value in the second part of the image data.

14. The image-forming apparatus according to claim 13, wherein the plurality of first light-emitting portions and the plurality of second light-emitting portions are organic electro-luminescence, EL, elements.

* * * * *